United States Patent
Park et al.

(10) Patent No.: US 11,525,040 B2
(45) Date of Patent: Dec. 13, 2022

(54) SILANE COMPOUND INCLUDING FLUORINE-CONTAINING (POLY)ETHER GROUP, COMPOSITION INCLUDING THE SAME, FILM FORMED FROM THE COMPOSITION, DISPLAY DEVICE COMPRISING THE FILM, AND ARTICLE COMPRISING THE COMPOSITION

(71) Applicant: Samsung Electronics Co., Ltd., Suwon-si (KR)

(72) Inventors: Byungha Park, Suwon-si (KR); Woncheol Jung, Seoul (KR); Hyeyoung Kong, Uijeongbu-si (KR); Inki Kim, Hwaseong-si (KR); Hana Kim, Yongin-si (KR); Dmitry Androsov, Suwon-si (KR); Kyeongsik Ju, Suwon-si (KR); Jungha Chae, Suwon-si (KR); Fedosya Kalinina, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/164,672

(22) Filed: Feb. 1, 2021

(65) Prior Publication Data

US 2021/0261738 A1 Aug. 26, 2021

(30) Foreign Application Priority Data

Feb. 26, 2020 (KR) .................. 10-2020-0023541

(51) Int. Cl.
  *C08G 77/24* (2006.01)
  *C07F 7/18* (2006.01)
  *C09D 183/08* (2006.01)

(52) U.S. Cl.
  CPC ............ *C08G 77/24* (2013.01); *C07F 7/1804* (2013.01); *C09D 183/08* (2013.01)

(58) Field of Classification Search
  CPC .............................. C07F 7/1804; C08G 77/24
  See application file for complete search history.

(56) References Cited

U.S. PATENT DOCUMENTS

| | | | | |
|---|---|---|---|---|
| 6,200,684 B1 * | 3/2001 | Yamaguchi | ........ | G02B 27/0006 556/419 |
| 8,013,064 B2 | 9/2011 | Nakazato et al. | | |
| 10,696,848 B2 | 6/2020 | Hoshino et al. | | |
| 11,149,042 B2 * | 10/2021 | Chen | ........ | C09D 171/00 |
| 2008/0002993 A1 | 12/2008 | Koichi et al. | | |
| 2008/0299399 A1 * | 12/2008 | Yamaguchi | .......... | C08G 65/336 528/26 |
| 2013/0220177 A1 * | 8/2013 | Iyer | ........ | C08G 65/336 106/287.14 |
| 2019/0218339 A1 | 7/2019 | Hoshino et al. | | |
| 2020/0291259 A1 | 9/2020 | Jung et al. | | |
| 2020/0407378 A1 * | 12/2020 | Chen | ........ | C09D 171/00 |
| 2021/0054149 A1 | 2/2021 | Kim et al. | | |
| 2021/0214495 A1 * | 7/2021 | Chen | ........ | C09D 171/02 |
| 2021/0332248 A1 * | 10/2021 | Yamane | ............ | C09D 5/1675 |

FOREIGN PATENT DOCUMENTS

| | | | |
|---|---|---|---|
| CN | 109071793 | * | 12/2018 |
| EP | 1997824 A1 | | 12/2008 |
| JP | 2012219217 A | | 11/2012 |
| KR | 1020150054148 A | | 5/2015 |
| KR | 1020180138203 A | | 12/2018 |
| KR | 1020190046792 A | | 5/2019 |
| WO | 2008130872 A1 | | 10/2008 |
| WO | 2009008380 A1 | | 1/2009 |
| WO | 2017187775 A1 | | 11/2017 |

OTHER PUBLICATIONS

English Abstract of JP 2012-219217.
English Abstract of KR 10-2015-0054148.
English Abstract of WO 2009-008380.

* cited by examiner

*Primary Examiner* — Margaret G Moore
(74) *Attorney, Agent, or Firm* — Cantor Colburn LLP

(57) ABSTRACT

Disclosed are a composition comprising a silane compound having a fluorine-containing (poly)ether group represented by Formula 1, a film formed from the composition, a display device including the film, and an article including a coating product of the composition:

Rf-$(L^1)_{p1}$(L)$_a$-C(=O)NR-$(L^2)_{p2}$-Si($R_1$)($R_2$)($R_3$)  Formula 1 wherein in Formula 1, R is -$(L^3)_{p3}$-Si($R_4$)($R_5$)($R_6$),
L is —$CH_2$— or —$CH_2$—O—$CH_2$—,
Rf is a fluorine-containing (poly)ether group, and
$L^1$ to $L^3$, p1 to p3, and $R_1$ to $R_6$ are the same as defined in the detailed description.

14 Claims, 3 Drawing Sheets

SILANE COMPOUND INCLUDING FLUORINE-CONTAINING (POLY)ETHER GROUP, COMPOSITION INCLUDING THE SAME, FILM FORMED FROM THE COMPOSITION, DISPLAY DEVICE COMPRISING THE FILM, AND ARTICLE COMPRISING THE COMPOSITION

CROSS-REFERENCE TO RELATED APPLICATION

This application claims priority to and the benefit of Korean Patent Application No. 10-2020-0023541, filed on Feb. 26, 2020, in the Korean Intellectual Property Office, the disclosure of which is incorporated herein in its entirety by reference.

BACKGROUND

1. Field

Embodiments relate to a silane compound including a fluorine-containing (poly)ether group, a composition including the same, a film formed from the composition, a display device comprising the film, and an article coated with the composition.

2. Description of Related Art

A portable electronic device, such as a smart phone or a tablet PC, may employ a functional layer having a variety of functions. Particularly, as a touch screen panel recognizing a contact position using a finger or a tool have become more common, in order to improve a surface slip property and a touch sense of a touch screen panel, a functional layer may be formed on the surface of a display panel.

However, such a functional layer has low durability, and thus is liable to be compromised, lost, or destroyed, resulting in degradation of its functionality. Accordingly, there exists a need for improvement with respect to the degraded functionality.

SUMMARY

According to an aspect, provided are a novel silane compound having a fluorine-containing (poly)ether group, and a composition comprising the same, thereby providing improved durability, chemical resistance, and brine resistance.

According to another aspect, provided is a film formed from the composition, thereby providing improved durability, chemical resistance, and brine resistance.

According to another aspect, provided is a display device including the film.

According to another aspect, provided is an article coated with the composition.

Additional aspects will be set forth in part in the description which follows and, in part, will be apparent from the description, or may be learned by practice of the presented embodiments of the disclosure.

According to an aspect, provided is a silane compound having a fluorine-containing (poly)ether group and being represented by Formula 1:

Formula 1 wherein in Formula 1,
R is $-(L^3)_{p3}-Si(R_4)(R_5)(R_6)$,
L is $-CH_2-$ or $-CH_2-O-CH_2-$,
Rf is a fluorine-containing (poly)ether group,
$L^1$ is each independently a substituted or unsubstituted C1 to C20 alkylene group, a substituted or unsubstituted C1 to C20 oxyalkylene group, or a combination thereof,
$L^2$ and $L^3$ are each independently a substituted or unsubstituted C1 to C20 alkylene group, a substituted or unsubstituted C1 to C20 oxyalkylene group, a substituted or unsubstituted hetero atom containing C1 to C20 alkylene group, a substituted or unsubstituted cycloalkyl group, a substituted or unsubstituted C7 to C30 arylalkylene group, or a combination thereof,
p1 to p3 are each independently an integer of 1 to 10,
a is an integer of 1 to 5, and
$R_1$ to $R_6$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl groups, hydroxy group, or a combination thereof,
with the proviso that at least one of $R_1$ to $R_3$ and at least one of $R_4$ to $R_6$ are each independently a substituted or unsubstituted C1 to C20 alkoxy group, a halogen atom, or a hydroxy group.

According to another aspect, provided is a composition comprising the silane compound having a fluorine-containing (poly)ether group and being represented by Formula 1.

According to still another aspect, provided is a film comprising a hydrolysis and polycondensation product of the silane compound having a fluorine-containing (poly)ether group and being represented by Formula 1.

According to still another aspect, provided is a film comprising i) a combination of a hydrolysis and polycondensation product of the silane compound having a fluorine-containing (poly)ether group and being represented by Formula 1, and a compound represented by Formula 3, or ii) comprising a combination of the silane compound having a fluorine-containing (poly)ether group and being represented by Formula 1, and a hydrolysis and polycondensation product of a compound represented by Formula 3, or iii) a combination of a hydrolysis and polycondensation product of the silane compound having a fluorine-containing (poly) ether group according to claim 1 and being represented by Formula 1, and a hydrolysis and polycondensation product of the compound represented by Formula 3:

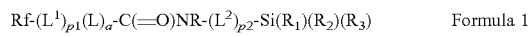
Formula 1 wherein in Formula 1,
R is $-(L^3)_{p3}-Si(R_4)(R_5)(R_6)$,
L is $-CH_2-$ or $-CH_2-O-CH_2-$,
Rf is a fluorine-containing (poly)ether group,
$L^1$ is each independently a substituted or unsubstituted C1 to C20 alkylene group, a substituted or unsubstituted C1 to C20 oxyalkylene group, or a combination thereof,
$L^2$ and $L^3$ are each independently a substituted or unsubstituted C1 to C20 alkylene group, a substituted or unsubstituted C1 to C20 oxyalkylene group, a substituted or unsubstituted hetero atom containing C1 to C20 alkylene group, a substituted or unsubstituted cycloalkyl group, a substituted or unsubstituted C7 to C30 arylalkylene group, or a combination thereof,
p1 to p3 are each independently an integer of 1 to 10,
a is an integer of 1 to 5, and
$R_1$ to $R_6$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, a hydroxy group, or a combination thereof, with the proviso that at least one of $R_1$ to $R_3$ and at least one of $R_4$ to $R_6$ are each independently a substituted or unsubstituted C1 to C20 alkoxy group, a halogen atom, or a hydroxy group, $$A\text{-}L^6\text{-}Si(R_1)(R_2)(R_3) \qquad \text{Formula 3}$$

wherein in Formula 3,

A is a halogen atom, a thiol group, an isocyanate group, an amino group, an allylamino group, or —NH($L^7$-Si($R_4$)($R_5$)($R_6$)), $L^6$ and $L^7$ are each independently a substituted or unsubstituted C1 to C20 alkylene group, a substituted or unsubstituted C6 to C20 arylene group, or a combination thereof, and $R_1$ to $R_6$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R_1$ to $R_3$ and at least one of $R_4$ to $R_6$ are each independently a substituted or unsubstituted C1 to C20 alkoxy group, a halogen atom, or a hydroxy group, and $$FpE\text{-}(L^2)_{p1}\text{-}LG\text{-}(L^3)_{p2}\text{-}SiR^aR^bR^c \qquad \text{Formula 4}$$

wherein in Formula 4,

FpE is a fluorine-containing (poly)ether moiety, $R^a$, $R^b$ and $R^c$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R^a$, $R^b$ and $R^c$ is a substituted or unsubstituted C1 to C20 alkoxy group, a halogen atom, or a hydroxy group, $L^2$ and $L^3$ are each independently a substituted or unsubstituted C1 to C20 alkylene group, a substituted or unsubstituted C6 to C20 arylene group, a substituted or unsubstituted C1 to C20 oxyalkylene group, or a combination thereof, and p1 and p2 are each independently an integer of 0 to 10.

According to still another aspect, provided is a display device comprising a film including a hydrolysis and polycondensation product of the silane compound having a fluorine-containing (poly)ether group as described above.

According to still another aspect, provided is an article coated with the composition comprising the silane compound having a fluorine-containing (poly)ether group as described above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
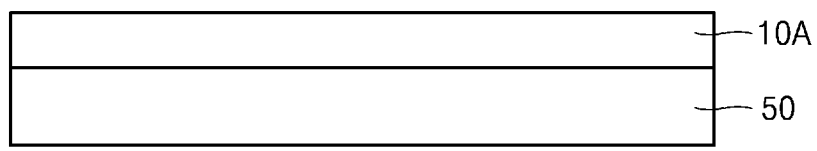
FIG. 1 is a cross-sectional view of a display device according to an embodiment.

Reference will now be made in detail to embodiments, examples of which are illustrated in the accompanying drawings so that a person skilled in the art would understand the same, wherein like reference numerals refer to like elements throughout.

In this regard, the present embodiments may have different forms and should not be construed as being limited to the descriptions set forth herein. Accordingly, the embodiments are merely described below, by referring to the figures, to explain aspects.

However, this disclosure may be embodied in many different forms, should not be construed as being limited to the embodiments set forth herein, and should be construed as including all modifications, equivalents, and alternatives within the scope of the present disclosure; rather, these embodiments are provided so that this disclosure will be thorough and complete, and will fully convey the effects and features of the disclosure and ways to implement the disclosure to those skilled in the art.

In the drawings, the thickness of layers, films, panels, regions, etc., are exaggerated for clarity. Like reference numerals designate like elements throughout the specification. The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. As used herein, the term "and/or" includes any and all combinations of one or more of the associated listed items. "Or" means "and/or." Expressions such as "at least one of," when preceding a list of elements, modify the entire list of elements and do not modify the individual elements of the list. "At least one" and "one or more" is not to be construed as limiting "a" or "an."

It will be understood that when an element such as a layer, film, region, or substrate is referred to as being "on" another element, it can be directly on the other element or intervening elements may also be present. In contrast, when an element is referred to as being "directly on" another element, there are no intervening elements present.

About" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

For example, "about" can mean within one or more standard deviations, or within ±10% or ±5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a silane compound having a fluorine-containing (poly)ether group according to an embodiment, a composition comprising the same, a film formed therefrom, a stacked structure, a display device, and an article, and a method of preparing the stacked structure, will be described in further detail.

According to an aspect, there is provided a silane compound including a fluorine-containing (poly)ether group, the silane compound being represented by Formula 1

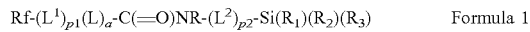

Formula 1 wherein in Formula 1,

R is -(L$^3$)$_{p3}$-Si(R$_4$)(R$_5$)(R$_6$),

L is —CH$_2$— or —CH$_2$—O—CH$_2$—,

Rf is a fluorine-containing (poly)ether group,

L$^1$ is each independently a substituted or unsubstituted C1 to C20 alkylene group, a substituted or unsubstituted C1 to C20 oxyalkylene group, or a combination thereof, L$^2$ and L$^3$ are each independently a substituted or unsubstituted C1 to C20 alkylene group, a substituted or unsubstituted C1 to C20 oxyalkylene group, a substituted or unsubstituted hetero atom containing C1 to C20 alkylene group, a substituted or unsubstituted cycloalkyl group, a substituted or unsubstituted C7 to C30 arylalkylene group, or a combination thereof, p1 to p3 are each independently an integer of 1 to 10, a is an integer of 1 to 5, and R$_1$ to R$_6$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, a halogen atom, a hydroxy group, or a combination thereof, with the proviso that at least one of R$_1$ to R$_3$ and at least one of R$_4$ to R$_6$ are each independently a substituted or unsubstituted C1 to C20 alkoxy group, a halogen atom, or a hydroxy group.

R$_1$ to R$_6$ may be, for example, each independently a methoxy group, an ethoxy group, a propoxy group, or a butyloxy group.

According to another aspect, provided is a composition comprising the above-described silane compound having a fluorine-containing (poly)ether group.

In the definition of Rf, a fluorine-containing (poly)ether group may be a perfluoro(poly)ether group.

The composition comprising the fluorine-containing silane compound is used as a surface coating material. When a surface coating film is formed on a display using such a composition, abrasion may occur with the passage of time, degrading durability and lowering chemical resistance. Accordingly, there exists a need for improvement in these properties.

In order to solve the above-described problems, the present inventors developed a composition comprising a silane compound having a fluorine-containing (poly)ether group represented by Formula 1, thereby providing improved abrasion resistance and durability, while improving chemical resistance and brine resistance by maintaining a high slip property and increasing bonding between each of a plurality of silane compounds each having a fluorine-containing (poly)ether group.

Compared with the available fluorine-containing silane compounds, the silane compound having the fluorine-containing (poly)ether group represented by Formula 1 demonstrates improved brine resistance by introducing tertiary amide functionality. In an embodiment, the silane compound having the fluorine-containing (poly)ether group represented by Formula 1 may have increased the number of hydrolysable silane groups, compared to the available fluorine-containing silane compounds, and thus bonding between each of a plurality of silane compounds each having the fluorine-containing (poly)ether group may be increased.

The composition may further include an additive capable of interacting with the silane compound having the fluorine-containing (poly)ether group represented by Formula 1. By further including the additive, the composition may have further improved durability.

The composition comprising the silane compound having a fluorine-containing (poly)ether group represented by Formula 1 according to an embodiment may demonstrate not only improved water repellency and an anti-fingerprint function but also abrasion resistance and durability when it is applied to a surface of a touch screen panel or a surface of a display panel such as a liquid display device (LCD) or a plasma display panel (PDP).

The composition comprising the silane compound having a fluorine-containing (poly)ether group represented by Formula 1 according to an embodiment may be coated on a surface of a substrate, and thus a film is formed. The silane compound having a fluorine-containing (poly)ether group represented by Formula 1 is constructed such as when a perfluoroether(poly)ether (PFPE) group is provided as the fluorine-containing (poly)ether group, the PFPE group is connected with a hydrolyzable silane group by an amide bond.

The hydrolyzable silane group may be a silane substituted with at least one hydrolyzable functional group, for example, a silane substituted with at least one substituted or unsubstituted C1 to C20 alkoxy group, a halogen atom, or a hydroxy group.

The hydrolyzable silane group may be bound to a substrate or a lower layer by a hydrolysis and/or polycondensation reaction during a coating or depositing process.

Since the hydrolyzable silane group has a hydrolyzable functional group, when the composition is subjected to a coating process, hydrolysis and polycondensation of the hydrolyzable silane group is carried out, and thus a network of the hydrolysis and polycondensation product of silane may be formed.

The hydrolyzable functional group may include, for example, a C1-C10 alkoxy group, a halogen atom, a hydroxy group, and a C1-C8 alkoxy group such as a methoxy group or an ethoxy group. Among others, the methoxy group has a high hydrolysis reactivity.

In the silane compound having a fluorine-containing (poly)ether group represented by Formula 1 according to an embodiment, Rf is perfluoroether or perfluoropolyether.

The fluorine-containing (poly)ether group may have, for example, i) a $CF_3O$ group, a $CF_3CF_2O$ group, or a $CF_3CF_2CF_2O$ group at a terminal end, and —$(CF_2CF_2O)_n$— and —$(CF_2O)_m$—, wherein m and n are each independently an integer of 1 to 100, and are coupled to the $CF_3O$ group, the $CF_3CF_2O$, or the $CF_3CF_2CF_2O$ group, or ii) a $CF_3O$ group, a $CF_3CF_2O$ group, or a $CF_3CF_2CF_2O$ group at a terminal end, and —$(CF_2CF_2O)_n$—, —$(CF_2CH_2O)_n$—, —$(CH_2CF_2O)_n$—, —$(CF_2O)_m$—, —$(CF_2CF_2CF_2O)_n$—, —$(CF_2CF_2CF_2CF_2O)_n$— or —$(CF_2CF_2CF_2CF_2CF_2O)_n$— wherein m and n are each independently an integer of 1 to 100, and are coupled to the $CF_3O$ group, the $CF_3CF_2O$ group, or the $CF_3CF_2CF_2O$ group in any order. The term "order" used herein refers to an order in which —$(CF_2CF_2O)_n$— and —$(CF_2O)_m$— are each coupled to the $CF_3O$ group, the $CF_3CF_2O$ group, or the $CF_3CF_2CF_2O$ group. Each of m and n is an integer of, for example, 1 to 60, an integer of, for example, 5 to 55, an integer of, for example, 10 to 50, or an integer of, for example, 15 to 40.

The fluorine-containing (poly)ether group may be, for example, $CF_3O$—$(CF_2CF_2O)_n$—$(CF_2O)_m$—,
$CF_3O$—$(CF_2O)_m$—$(CF_2CF_2O)_n$—,
$CF_3CF_2O$—$(CF_2CF_2O)_n$—$(CF_2O)_m$—,
$CF_3CF_2O$—$(CF_2O)_m$—$(CF_2CF_2O)_n$—,
$CF_3CF_2CF_2O$—$(CF_2CF_2O)_n$—$(CF_2O)_m$—,
$CF_3O$—$(CF_2O)_m$—$(CF_2CF_2O)_n$—$(CF_2CH_2O)_k$—,
$CF_3O$—$(CF_2O)_m$—$(CF_2CF_2O)_n$—$(CH_2CF_2O)_k$—,
$CF_3O$—$(CF_2CF_2O)_n$—$(CF_2O)_m$—$(CF_2CH_2O)_k$—,
$CF_3O$—$(CF_2CF_2O)_n$—$(CF_2O)_m$—$(CH_2CF_2O)_k$—,
$CF_3CF_2O$—$(CF_2CF_2O)_m$—$(CF_2O)_n$—$(CF_2CH_2O)_k$—,
$CF_3CF_2O$—$(CF_2CF_2O)_m$—$(CF_2O)_n$—$(CH_2CF_2O)_k$—,
$CF_3CF_2O$—$(CF_2CF_2O)_m$—$(CF_2O)_n$—$(CF_2CH_2O)_k$—,
$CF_3CF_2O$—$(CF_2O)_n$—$(CF_2CF_2O)_m$—$(CF_2CH_2O)_k$—,
$CF_3CF_2O$—$(CF_2O)_n$—$(CF_2CF_2O)_m$—$(CH_2CF_2O)_k$—,
$CF_3CF_2O$—$(CF_2O)_n$—$(CF_2CF_2O)_m$—$(CF_2CH_2O)_k$—, or
$CF_3CF_2CF_2O$—$(CF_2O)_m$—$(CF_2CF_2O)_n$—.

Herein, m and n are each independently, for example, 0 or an integer of 1 or greater, for example, an integer of 1 to 100, for example, an integer of 1 to 60, for example, an integer of 5 to 55, for example, an integer of 10 to 50, or, for example, an integer of 15 to 40. In an embodiment, k is 0 or an integer of 1 to 10, for example, 0 or an integer of 1 to 5.

In Formula 1, Rf is $CF_3O(CF_2CF_2O)_n(CF_2O)_mCH_2OCH_2$—, n and m are each independently an integer of 1 to 100, for example, an integer of 1 to 60, for example, an integer of 5 to 55, for example, an integer of 10 to 50, or for example, an integer of 15 to 40.

The silane compound having a fluorine-containing (poly)ether group being represented by Formula 1 is $CF_3(CF_2)_hO(CF_2CF_2O)_n(CF_2O)_m(CF_2CH_2O)_k$—$(CH_2)_a$—$C(=O)NA_1A_2$,
$CF_3(CF_2)_hO(CF_2CF_2O)_n(CF_2O)_m(CF_2CH_2O)_k$—$(CH_2OCH_2)_a$—$C(=O)NA_1A_2$,
$CF_3(CF_2)_hO(CF_2CF_2O)_n(CF_2O)_m(CH_2CF_2O)_k$—$(CH_2)_a$—$C(=O)NA_1A_2$, or
$CF_3(CF_2)_hO(CF_2CF_2O)_n(CF_2O)_m(CH_2CF_2O)_k$—$(CH_2OCH_2)_a$—$C(=O)NA_1A_2$, $A_1$ is —$(CH_2)_{p2}$—$Si(R_1)(R_2)(R_3)$, $A_2$ is —$(CH_2)_{p3}$—$Si(R_3)(R_4)(R_5)$, n and m are each independently 0 or an integer of 1 to 100, h and k are each independently 0 or an integer of 1 to 10, p2 and p3 are each independently an integer of 1 to 10, and $R_1$ to $R_6$ are the same as defined in Formula 1. Herein, a is an integer of 1 to 5, for example, an integer of 1 to 3, or 1.

The silane compound having a fluorine-containing (poly)ether group being represented by Formula 1 may be, for example, $CF_3(CF_2)_hO(CF_2CF_2O)_n(CF_2O)_m$—$(CH_2)_a$—$C(=O)NA_1A_2$,
$CF_3(CF_2)_hO(CF_2CF_2O)_n(CF_2O)_m$—$(CH_2OCH_2)_a$—$C(=O)NA_1A_2$,
$CF_3(CF_2)_hO(CF_2CF_2O)_n(CF_2O)_m$—$(CH_2)_a$—$C(=O)NA_1A_2$, or
$CF_3(CF_2)_hO(CF_2CF_2O)_n(CF_2O)_m$—$(CH_2OCH_2)_a$—$C(=O)NA_1A_2$.

Herein, $A_1$ is —$(CH_2)_{p2}$—$Si(R_1)(R_2)(R_3)$, $A_2$ is —$(CH_2)_{p3}$—$Si(R_3)(R_4)(R_5)$, n and m are each independently 0 or an integer of 1 to 100, h and k are each independently 0, or an integer of 1 to 10, p2 and p3 are each independently an integer of 1 to 10, and $R_1$ to $R_6$ may be a fluorine-containing (poly)ether group as defined in Formula 1. Herein, a is an integer of 1 to 5, for example, an integer of 1 to 3, or 1.

The silane compound having a fluorine-containing (poly)ether group being represented by Formula 1 may be, for example, $CF_3(CF_2)_hO(CF_2CF_2O)_n(CF_2O)_m$—$CH_2$—$C(=O)NA_1A_2$,
$CF_3(CF_2)_hO(CF_2CF_2O)_n(CF_2O)_m$—$CH_2OCH_2$—$C(=O)NA_1A_2$,
$CF_3(CF_2)_hO(CF_2CF_2O)_n(CF_2O)_m$—$CH_2$—$C(=O)NA_1A_2$, or
$CF_3(CF_2)_hO(CF_2CF_2O)_n(CF_2O)_m$—$CH_2OCH_2$—$C(=O)NA_1A_2$.

Herein, $A_1$ is —$(CH_2)_{p2}$—$Si(R_1)(R_2)(R_3)$, $A_2$ is —$(CH_2)_{p3}$—$Si(R_3)(R_4)(R_5)$, n and m are each independently 0 or an integer of 1 to 100, h and k are each independently 0 or an integer of 1 to 10, p2 and p3 are each independently an integer of 1 to 10, and $R_1$ to $R_6$ each may be a fluorine-containing (poly)ether group as defined in Formula 1.

The silane compound having a fluorine-containing (poly)ether group being represented by Formula 1 may be, for example, $CF_3O(CF_2CF_2O)_n(CF_2O)_m$—$(CH_2)$—$C(=O)N\{(CH_2)_3$—$Si(OCH_3)(OCH_3)(OCH_3)\}_2$,
$CF_3O(CF_2O)_m(CF_2CF_2O)_n$—$(CH_2)$—$C(=O)N\{(CH_2)_3$—$Si(OCH_3)(OCH_3)(OCH_3)\}_2$,
$CF_3CF_2O(CF_2CF_2O)_n(CF_2O)_m$—$(CH_2)$—$C(=O)N\{(CH_2)_3$—$Si(OCH_3)(OCH_3)(OCH_3)\}_2$,
$CF_3CF_2O(CF_2O)_m(CF_2CF_2O)_n$—$(CH_2)$—$C(=O)N\{(CH_2)_3$—$Si(OCH_3)(OCH_3)(OCH_3)\}_2$,
$CF_3CF_2O(CF_2CF_2O)_n(CF_2O)_m$—$(CH_2)$—$C(=O)N\{(CH_2)_3$—$Si(OCH_3)(OCH_3)(OCH_3)\}_2$,
$CF_3O(CF_2CF_2O)_n(CF_2O)_m(CF_2CH_2O)_k$—$(CH_2)$—$C(=O)N\{(CH_2)_3$—$Si(OCH_3)(OCH_3)(OCH_3)\}_2$,
$CF_3O(CF_2O)_m(CF_2CF_2O)_n(CF_2CH_2O)_k$—$(CH_2)$—$C(=O)N\{(CH_2)_3$—$Si(OCH_3)(OCH_3)(OCH_3)\}_2$,
$CF_3CF_2O(CF_2CF_2O)_n(CF_2O)_m(CF_2CH_2O)_k$—$(CH_2)$—$C(=O)N\{(CH_2)_3$—$Si(OCH_3)(OCH_3)(OCH_3)\}_2$,
$CF_3CF_2O(CF_2O)_m(CF_2CF_2O)_n(CF_2CH_2O)_k$—$(CH_2)$—$C(=O)N\{(CH_2)_3$—$Si(OCH_3)(OCH_3)(OCH_3)\}_2$,
$CF_3CF_2O(CF_2CF_2O)_n(CF_2O)_m(CF_2CH_2O)_k$—$(CH_2)$—$C(=O)N\{(CH_2)_3$—$Si(OCH_3)(OCH_3)(OCH_3)\}_2$, a compound of Formula 2-1, a compound of Formula 2-2, a compound of Formula 2-3, or a combination thereof:

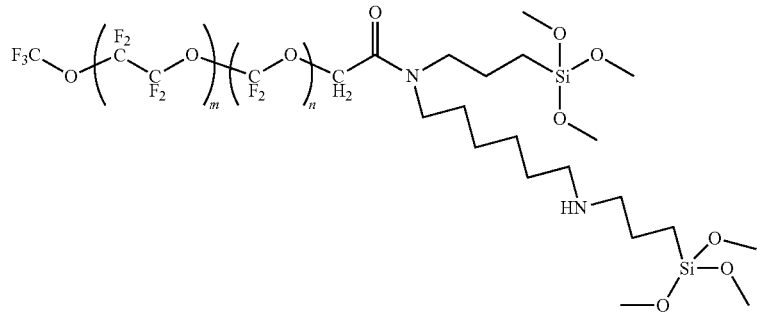

Formula 2-1

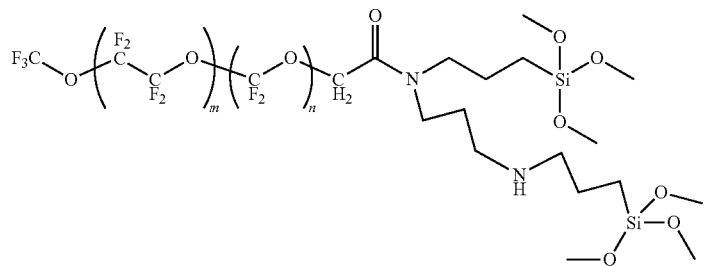

Formula 2-2

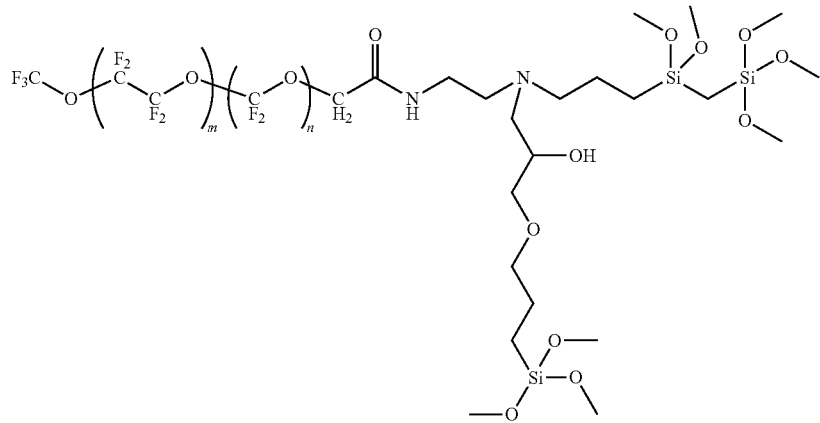

Formula 2-3 wherein in Formulae 2-1 to 2-3, the —(CF$_2$—CF$_2$—O)$_m$— unit and the —(CF$_2$—O)$_n$— unit are to be construed as including structures in which each unit is in any order, i.e., exchanged with each other in the F$_3$C(=O)—(CF$_2$—CF$_2$—O)$_m$—(CF$_2$—O)$_n$—. That is, in the Formulae 2-1 to 2-3, F$_3$C(=O)—(CF$_2$—CF$_2$—O)$_m$—(CF$_2$—O)$_n$— is to be construed as including F$_3$C(=O)(CF$_2$—O)$_n$—(CF$_2$—CF$_2$—O)$_m$— as well.

The silane compound having a fluorine-containing (poly) ether group according to an embodiment may have a weight average molecular weight of greater than or equal to about 2000 grams per mol (g/mol), greater than or equal to about 4000 g/mol, or greater than or equal to about 12,000 g/mol. For example, the fluorine-containing (poly)ether group may have a weight average molecular weight of between about 2000 to about 12,000 g/mol, or about 2000 to about 10,000 g/mol, or about 2000 to about 8000 g/mol, or about 2000 to about 6000 g/mol.

In an embodiment, the composition according to an embodiment may further include a compound of Formula 3 as an additive:

Formula 3 wherein in Formula 3,

A is a halogen atom, a thiol group, an isocyanate group, an amino group, an allylamino group or —NH(L$^7$-Si(R$_4$)(R$_5$)(R$_6$)), L$^6$ and L$^7$ are each independently a substituted or unsubstituted C1 to C20 alkylene group, a substituted or unsubstituted C6 to C20 arylene group, or a combination thereof, R$_1$ to R$_6$ are each independently a hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R_1$ to $R_3$ and at least one of $R_4$ to $R_6$ are each independently a substituted or unsubstituted C1 to C20 alkoxy group, a halogen atom, or a hydroxy group.

$R_1$ to $R_6$ may be, for example, methoxy groups, ethoxy groups, propoxy groups, or butoxy groups.

The compound of Formula 3 may be, for example, a compound of Formula 3A or a compound of Formula 3B:

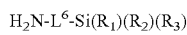

$$H_2N\text{-}L^6\text{-}Si(R_1)(R_2)(R_3) \quad \quad \text{Formula 3A}$$

wherein in Formula 3A, $L^6$, $R_1$ to $R_3$ are the same as defined in Formula 3, $$((R_4)(R_5)(R_6)Si\text{-}L^7)\text{-}HN\text{-}L^6\text{-}Si(R_1)(R_2)(R_3) \quad \quad \text{Formula 3B}$$

wherein in Formula 3B, $L^6$, $L^7$, and $R_1$ to $R_6$ are the same as defined in Formula 3.

The additive, that is, the compound of Formula 3, may form a non-covalent interaction with the silane compound having a fluorine-containing (poly)ether group. While not wanting to be bound by theory, it is understood that, the non-covalent interaction between the silane compound having a fluorine-containing (poly)ether group and the additive of Formula 3 is enabled by the group A, for example the amino group contained in the compounds of Formula 3A and Formula 3B. The non-covalent interaction, such as a hydrogen bond, is formed by a non-covalent electron pair of the group A (e.g., an amino group) contained in the compound of Formula 3 and hydrogen atoms of the amide group constituting the amide linking group in the silane compound having a fluorine-containing (poly)ether group, thereby further improving the durability of the substrate coated with the composition according to an embodiment.

When the composition further includes the compound of Formula 3, a mixing ratio by mol of the silane compound having a fluorine-containing (poly)ether group represented by Formula 1 to the compound of Formula 3 may be about 1:0.003 to about 1:3, for example, about 1:0.5 to about 1:3, and for example, about 1:1 to about 1:2.

The compound of Formula 3 may be, for example, $H_2N\text{—}(CH_2)_3\text{—}Si(OCH_3)(OCH_3)(OCH_3)$, $H_2N\text{—}(CH_2)_3\text{—}Si(OCH_2CH_3)(OCH_2CH_3)(OCH_2CH_3)$, $H_2N\text{—}(CH_2)_3\text{—}Si(OCH_3)(OCH_3)(CH_3)$, $H_2N\text{—}(CH_2)_3\text{—}Si(OCH_3CH_3)(OCH_3CH_3)(CH_2CH_3)$, $HN\text{—}\{(CH_2)_3\text{—}Si(OCH_3)(OCH_3)(OCH_3)\}_2$, $HN\text{—}\{(CH_2)_3\text{—}Si(OCH_2CH_3)(OCH_2CH_3)(OCH_2CH_3)\}_2$, $HN\text{—}\{(CH_2)_3\text{—}Si(OCH_3)(OCH_3)(CH_3)\}_2$, $HN\text{—}\{(CH_2)_3\text{—}Si(OCH_2CH_3)(OCH_2CH_3)(CH_2CH_3)\}_2$, a compound of Formula 3-1, a compound of Formula 3-2, or a combination thereof:

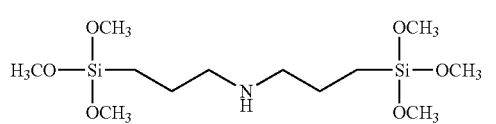

Formula 3-1

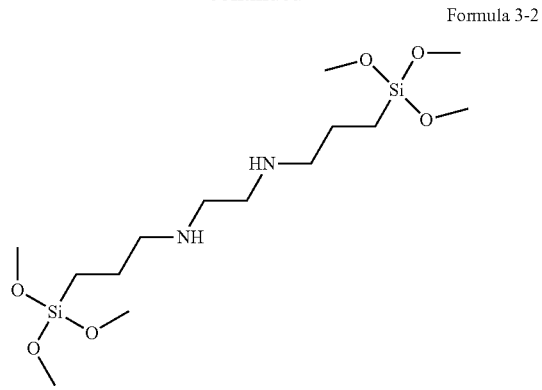

Formula 3-2 wherein in the silane compound having a fluorine-containing (poly)ether group, the fluorine-containing (poly)ether group may have a weight average molecular weight in a range of about 1,000 to about 10,000 g/mol, for example, about 2,000 to about 9,000 g/mol, or for example, about 3,000 to about 6,000 g/mol.

The composition may further include a compound of Formula 4:

$$FpE\text{-}(L^2)_{p1}\text{-}LG\text{-}(L^3)_{p2}\text{—}SiR^aR^bR^c \quad \quad \text{Formula 4}$$

wherein in Formula 4,

FpE is a fluorine-containing (poly)ether moiety, $R^a$, $R^b$ and $R^c$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R^a$, $R^b$ and $R^c$ is a substituted or unsubstituted C1 to C20 alkoxy group, a halogen atom, or a hydroxy group, LG is a linking group having a hydrogen-bonding functional group, $L^2$ and $L^3$ are each independently a substituted or unsubstituted C1 to C20 alkylene group, a substituted or unsubstituted C6 to C20 arylene group, a substituted or unsubstituted C1 to C20 oxyalkylene group, or a combination thereof, and p1 and p2 are each independently 0 or an integer of 1 to 10.

In the composition, a mixing ratio by mol of the compound of Formula 2 to the compound of Formula 4 may be about 0.003:1 to about 3:1, for example, about 0.5:1 to about 3:1, and for example, about 1:1 to about 2:1. The substrate coated with a surface coating material including the composition having the mixing ratio within the ranges stated above may have improved durability.

The compound represented by Formula 4 may have a fluorine-containing (poly)ether group and a hydrolyzable silane group at opposite terminals, respectively, and thus a plurality of fluorine-containing silane compounds may be configured to be aligned in one direction due to a difference in the surface energy between the opposite terminals. The compound may include a fluorine-containing (poly)ether group positioned at one terminal thereof, a hydrolyzable silane group positioned at the other terminal, and a linking group positioned between the fluorine-containing (poly)ether group and the hydrolyzable silane group.

The fluorine-containing (poly)ether group may be, for example, at least one fluorine-containing (poly)ether moiety, for example, perfluoro(poly)ether. The fluorine-containing (poly)ether moiety may be represented by, for example, $CF_3O(CF_2CF_2O)_n(CF_2O)_mCF_2$, wherein n and m are each independently 1 to 60, but is not limited thereto.

The hydrolyzable silane group may be silane substituted with at least one hydrolyzable functional group, for example, silane substituted with at least one substituted or unsubstituted C1 to C20 alkoxy group, a halogen atom, or a hydroxy group.

The hydrolyzable silane group may be bound to a substrate or a lower layer by a hydrolysis and/or condensation polymerization reaction during a coating or depositing process.

The linking group (LG) may be disposed between the fluorine-containing (poly)ether moiety and the hydrolyzable silane moiety and may form a non-covalent interaction with adjacent molecules. The non-covalent interaction represent bonds, not a covalent bond and may be, for example, a hydrogen bond.

The linking group capable of forming a hydrogen bond may have, for example, a hetero atom such as nitrogen, oxygen, sulfur (having a non-covalent electron pair), or a combination thereof, and may be, for example, —C(=O)NR$^d$—, —OC(=O)NR$^e$—, —OC(=O)NR$^f$S(=O)—, —OC(=O)NR$^g$S(=O)O—, or a combination thereof, wherein R$^d$ to R$^g$ are each independently hydrogen, a substituted or unsubstituted C1 to C20 alkyl group, a substituted or unsubstituted C6 to C20 aryl group, or a combination thereof, but is not limited thereto. For example, the linking group may be any suitable linking group capable of forming a hydrogen bond.

For example, the fluorine-containing silane compound of Formula 4 may be a linear type. When the fluorine-containing silane compound is a branch type compound including a substituent such as —CF$_3$, the slip property of a surface of the substrate coated with a surface coating material including the compound may be deteriorated.

For example, the fluorine-containing silane compound of Formula 4 may have a weight average molecular weight of about 4,000 g/mol to about 10,000 g/mol, for example, about 5,000 to about 9,000 g/mol, or about 6,000 to about 8,000 g/mol. When the fluorine-containing silane compound has a weight average molecular weight within the range stated above, the durability of the surface coating material comprising the fluorine-containing silane compound may be further improved.

For example, the FpE may be a perfluoro(poly)ether, and may be represented by, for example, $CF_3O(CF_2CF_2O)_n(CF_2O)_mCF_2$ wherein n and m are each independently an integer of 1 to 100. For example, one of the R$^a$, R$^b$ and R$^c$ may be a substituted or unsubstituted C1 to C20 alkoxy group, a halogen atom, or a hydroxy group. For example, two of the R$^a$, R$^b$ and R$^c$ may be substituted or unsubstituted C1 to C20 alkoxy groups, halogen atoms, or hydroxy groups. For example, each of the R$^a$, R$^b$ and R$^c$ may be a substituted or unsubstituted C1 to C20 alkoxy group, a halogen atom, or a hydroxy group.

The LG of the fluorine-containing silane compound of Formula 4 may be a hydrogen-bonding functional group and may be represented by, for example, —C(=O)NR$^d$—, —OC(=O)NR$^e$—, —OC(=O)NR$^f$S(=O)—, —OC(=O)NR$^g$S(=O)O—, or a combination thereof, wherein R$^d$ to R$^g$ are each independently hydrogen, a substituted or unsubstituted C1 to C20 alkyl group, a substituted or unsubstituted C6 to C20 aryl group, or a combination thereof.

The L$^2$ and L$^3$ of the fluorine-containing silane compound of Formula 4 may be each independently a substituted or unsubstituted methylene group, a substituted or unsubstituted ethylene group, a substituted or unsubstituted propylene group, a substituted or unsubstituted butylene group, substituted or unsubstituted pentylene group, a substituted or unsubstituted hexylene group, a substituted or unsubstituted phenylene group, a substituted or unsubstituted biphenylene group, a substituted or unsubstituted naphthylene group, a substituted or unsubstituted oxymethylene group, a substituted or unsubstituted oxyethylene group, a substituted or unsubstituted oxypropylene group, or a combination thereof.

The fluorine-containing silane compound represented by Formula 4 may be represented by Formula 4A or 4B:

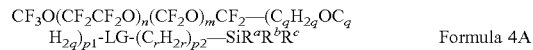

Formula 4A

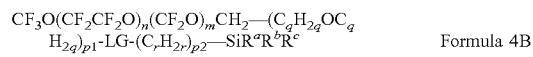

Formula 4B wherein in the Formula 4A and Formula 4B,

LG, R$^a$, R$^b$, R$^c$, n, m, p1, and p2 are the same as defined above, and q and r are each independently an integer of 1 to 5.

For example, the fluorine-containing silane compound may be represented by Formula 4A-1 or Formula 4B-1:

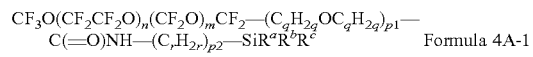

Formula 4A-1

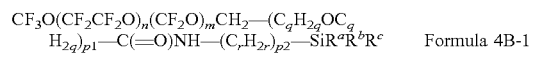

Formula 4B-1 wherein in Formula 4A-1 and Formula 4B-1,

R$^a$, R$^b$, R$^c$, n, m, p1, p2, q and r are the same as defined above, respectively.

The compound represented by Formula 4 may be a compound represented by Formula 4-1 or a compound represented by Formula 4-2:

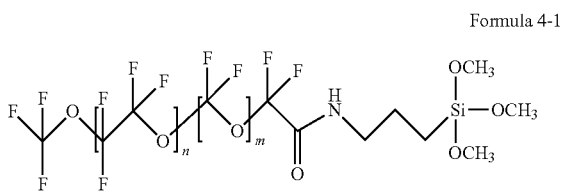

Formula 4-1 wherein in Formula 4-1, n is a number of 1 to 100, for example, a number of 1 to 80, and m is a number of 1 to 100,

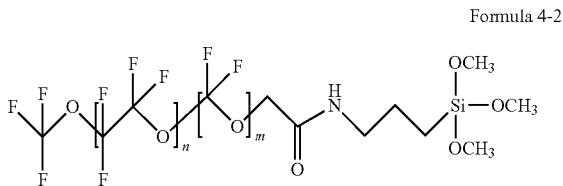

Formula 4-2 wherein in Formula 4-2, n is a number of 1 to 100, for example, a number of 1 to 80, and m is a number of 1 to 100.

The composition according to an embodiment may maintain a robust inter-chain interaction between adjacent molecules by including a plurality of fluorine-containing silane compounds each having a linking group capable of forming a non-covalent interaction with the adjacent molecules between the fluorine-containing (poly)ether moiety and the hydrolyzable silane moiety together with an additive represented by Formula 3, thereby suppressing or preventing bonding between each of the plurality of fluorine-containing silane compounds from being lost and/or destroyed due to frequent frictions. Accordingly, the surface coating material can be prevented from being readily abraded due to frequent frictions, and the durability of the surface coating material can also be improved.

According to still another aspect, provided is a film comprising a hydrolysis and polycondensation product of the silane compound having a fluorine-containing (poly) ether group represented by Formula 1.

The term "a hydrolysis and polycondensation product of a silane compound having a fluorine-containing (poly)ether group" used herein means one or more of the products resulting from a polycondensation reaction of a hydrolysis products obtained by a hydrolysis reaction of the silane compound including a fluorine-containing (poly)ether group.

The film may further include a compound of Formula 3, a compound of Formula 4, or a combination thereof, or a hydrolysis and polycondensation product thereof. A mixing ratio by weight of the hydrolysis and polycondensation product of the silane compound having a fluorine-containing (poly)ether group represented by Formula 1 to the compound of Formula 3, the compound of Formula 4, or the combination thereof, may be about 1:0.5 to about 1:3, for example, about 1:1 to about 1:2.

According to another aspect, provided is a film comprising i) a hydrolysis and polycondensation product of the silane compound having a fluorine-containing (poly)ether group represented by Formula 1, together with the compound represented by Formula 3 in combination, or ii) comprising a combination of the silane compound having a fluorine-containing (poly)ether group represented by Formula 1 and a product of hydrolysis and polycondensation the compound represented by Formula 3, or a hydrolysis and polycondensation product of the silane compound having a fluorine-containing (poly)ether group represented by Formula 1 a product of hydrolysis and polycondensation the compound represented by Formula 3.

According to another aspect, provided is a film comprising a hydrolysis and polycondensation product of the silane compound having a fluorine-containing (poly)ether group represented by Formula 1, together with the compound represented by Formula 3, and the compound of Formula 4, or a combination thereof; or comprising a hydrolysis and polycondensation product of the silane compound having a fluorine-containing (poly)ether group represented by Formula 1, a hydrolysis and polycondensation product of the compound represented by Formula 3, a hydrolysis and polycondensation product the compound of Formula 4, or a hydrolysis and polycondensation product of a combination of the compound of Formula 3 and Formula 4.

The film may be formed by coating the composition according to an embodiment using a solution process or depositing the composition using a dry process. Therefore, the film may be a coated film or a deposited film. According to an embodiment, provided is a process of coating the surface coating material on a substrate, for example, a glass substrate (glass plate). The process will now be described in detail. The film may be obtained by coating a solution having the composition dissolved or dispersed in a solvent by, for example, spin coating, slit coating, inkjet printing, spray coating, or immersion, followed by drying. The deposited film may be obtained by, for example, thermal deposition, vacuum deposition, or chemical vapor deposition.

The solvent may be, for example, a fluorinated ether-based solvent. For example, 1,1,2,2-tetrafluoroethyl-2,2,3,3-tetrafluoropropyl ether,
1,1,2,2,-tetrafluoroethyl-1H,1H,5H-octafluoropentyl ether,
1,1,2,2-tetrafluoroethyl-2,2,2-trifluoroethyl ether,
or a mixture thereof, may be used as the fluorinated ether-based solvent.

The film may be formed on a substrate, and the substrate may be, for example, a ceramic or glass plate, but is not limited thereto.

The film may include a hydrolysis and polycondensation product of the silane compound having a fluorine-containing (poly)ether group represented by Formula 1. The film may further include a compound represented by Formula 3, a compound of Formula 4, or a combination thereof. A mixing ratio by mole of the silane compound having a fluorine-containing (poly)ether group represented by Formula 1 to the compound of Formula 3, the compound of Formula 4, or a combination thereof, to provide the of the hydrolysis and polycondensation product, may be about 1:0.003 to about 1:3, for example, about 1:0.5 to about 1:3, or about 1:1 to about 1:2.

According to an embodiment, the film may include a hydrolysis and polycondensation product of a combination of the silane compound having a fluorine-containing (poly) ether group represented by Formula 1 with the compound of Formula 3, and the compound of Formula 4, or a combination thereof. As described above, the compound represented by Formula 3, the compound of Formula 4 or the combination thereof may participate in the hydrolysis and polycondensation of the silane compound having a fluorine-containing (poly)ether group represented by Formula 1 during the film formation process.

The hydrolyzable silane group of the silane compound containing a fluorine-containing (poly)ether group may be coupled to a substrate side, and the fluorine-containing (poly)ether group may be arranged on a surface (air) side. The plurality of fluorine-containing (poly)ether group containing silane compounds may be arranged in a direction substantially perpendicular to the substrate.

The anti-fingerprint coating performance can be quantified by analyzing a through a contact angle to water and a contact angle to diiodomethane.

The film according to an embodiment may have the fluorine-containing (poly)ether group on the surface thereof and thus may have a high contact angle. Accordingly, the film may have a good slip property and water repellency. The film may have a contact angle of, for example, greater than or equal to about 100 degrees (°), for example, within the range, greater than or equal to about 105°, for example, greater than or equal to about 110°, and for example, greater than or equal to about 115°. For example, a contact angle of about 100° to about 150°, about 100° to about 140°, about 100° to about 130°, about 110° to about 150°, about 110° to about 140°, about 110° to about 130°, about 115° to about 150°, about 115° to about 140°, or about 115° to about 130°. Herein, the contact angle may be measured by a Sessile drop technique. The contact angle may be measured by using water as a liquid and a Drop shape analyzer (DSA100, KRUSS, Germany) and dropping a predetermined amount (up to about 3 microliters (μl)) of water on the film.

The film may maintain a high contact angle even after frequent frictions. Durability of the film may be examined through a change in the contact angle after a plurality of frictions. For example, the film may have a contact angle change of less than or equal to about 20°, less than or equal to about 18°, less than or equal to about 15°, less than or equal to about 12°, and less than or equal to about 10°, after the 10,000 times' abrasion test with an eraser under a load of about 1 kilogram (kg). For example, the film may have a contact in angle change by about 20° to about 1°, about 18° to about 1°, about 15° to about 1°, about 12° to about 1°, or about 10° to about 1°. For example, the film may have a contact angle of about greater than or equal to 100° even after an abrasion test with an eraser under a load of about 1 kg. For example, a contact angle of about 100° to about 150°, about 100° to about 140°, or about 100° to about 130° even after the eraser abrasion test with 1 kg load.

In an embodiment, the contact angle of the film may also be measured by using diiodomethane, instead of water. In this embodiment, the film may have a contact angle of greater than or equal to about 90°, for example, within the range, greater than or equal to about 95°, and for example, greater than or equal to about 97°. For example, a contact angle of about 90° to about 150°, about 95° to about 150°, or about 97° to about 150°. The contact angle may be measured with a Drop shape analyzer (DSA100; KRUSS, Germany) using diiodomethane as a liquid for measuring the contact angle. That is, the contact angle was measured by dropping a predetermined amount (up to about 2.7 μl) of diiodomethane on the film.

The substrate and the film may form a stacked structure. The substrate may be, for example, a ceramic substrate or a glass substrate. The stacked structure may further include at least one layer between the substrate and the film. The stacked structure may be a transparent film, for example, a transparent flexible film.

For example, the film or the stacked structure may be attached on the display panel. Herein, the display panel and the film or the stacked structure may be directly bonded to the display panel or may be bonded to the display panel with an adhesive interposed between the film or the stacked structure and the display panel. The display panel may be for example a liquid crystal panel or an organic light emitting panel, but is not limited thereto. The film or the stacked structure may be disposed on the side of an observer.

Hereinafter, a method for preparing a stacked structure according to an embodiment will be described.

First, a primer layer of $SiO_2$ is formed on a surface of a substrate. Next, a composition according to an embodiment is coated on the primer layer.

E-beam or sputtering may be used in forming the primer layer of $SiO_2$ on the surface of the substrate primer layer.

The coating may be performed using a wet coating process based on a solution process or a deposition process based on a dry process.

FIG. 1 is a cross-sectional view of a display device according to an embodiment.

Referring to FIG. 1, a display device 100 according to an embodiment includes a display panel 50 and a functional film 10A.

The display panel 50 may be, for example, an organic light emitting display panel or a liquid crystal display panel, and may be in the form of, for example, a bendable display panel, a foldable display panel, or a Tollable display panel.

The functional film 10A may include the film or stacked structure and may be disposed on the side of an observer. Another layer may be further disposed between the display panel 50 and the functional film 10A, and may further include, for example, a monolayer or a plurality of polymer layers (not shown) and optionally a transparent adhesive layer (not shown).

Figure 2:
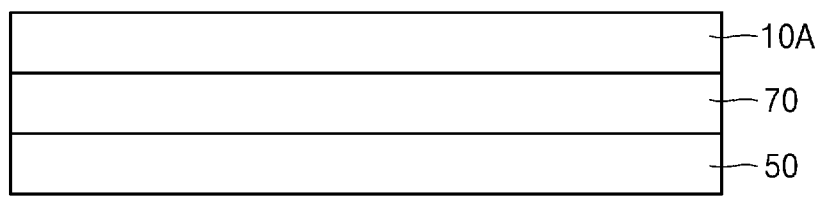
FIG. 2 is a cross-sectional view of a display device according to another embodiment.

FIG. 2 is a cross-sectional view of a display device according to an embodiment.

Referring to FIG. 2, a display device 200 according to another embodiment includes a display panel 50, a functional film 10A, and a touch screen panel 70 disposed between the display panel 50 and the functional film 10A.

The display panel 50 may be, for example, an organic light emitting panel or a liquid crystal panel, and may be in the form of, for example, a bendable display panel, a foldable display panel, or a reliable display panel.

The functional film 10A may include the film or the stacked structure and may be disposed on the side of an observer.

The touch screen panel 70 may be disposed adjacent to each of the functional film 10A and the display panel 50 to recognize the touched position and the position change when the touch screen panel 70 is touched by a human hand or an object through the functional film 10A and then to output a touch signal. A driving module (not shown) may monitor the touched position from the output touch signal, may recognize an icon marked at the touched position, and may control to carry out functions corresponding to the recognized icon, and the function performance results are displayed on the display panel 50.

Another layer may be further disposed between the touch screen panel 70 and the functional film 10A, and may further include, for example, a monolayer or a plurality of polymer layers (not shown) and optionally a transparent adhesive layer (not shown).

Another layer may be further disposed between the touch screen panel 70 and the display panel 50, and may further include, for example, a monolayer or a plurality of polymer layers (not shown) and optionally a transparent adhesive layer (not shown).

The functional film 10A including the film or the stacked structure may be applied to a variety of electronic devices such as a display device, for example, a smart phone, a tablet PC, a camera, a touch screen device, and so on, but is not limited thereto.

An embodiment provides an article coated with the surface coating material on a substrate, for example, a glass substrate (glass plate). The article may include, for example, a mobile display device, a display for an automobile, a sensor, an optical article, and the like, but is not limited thereto.

Hereinafter, a method of preparing a silane compound having a fluorine-containing (poly)ether group represented by Formula 1 is provided.

The silane compound having a fluorine-containing (poly) ether group represented by Formula 1 may be prepared by the following two methods.

A first method for preparing the silane compound having a fluorine-containing (poly)ether group represented by Formula 1 includes reacting $Rf-(L^1)_{p1}-C(=O)-N(CH_2CH=CH_2)_2$ with a suitable silane compound to prepare the silane compound having a fluorine-containing (poly)ether group represented by Formula 1.

In $Rf-(L^1)_{p1}-C(=O)-N(CH_2CH=CH_2)_2$, Rf and $L^1$ are the same as defined in Formula 1.

The reaction between $Rf-(L^1)_{p1}-C(=O)-N(CH_2CH=CH_2)_2$ and the silane compound may be carried out under reaction conditions varying according to the kind of a start material, for example, at a temperature of about 25° C. to about 90° C., for example, about 25° C. to about 80° C., and for example, about 30° C. to about 75° C. The reaction may be carried out in the presence of, for example, a platinum catalyst containing a xylene solvent.

For example, a mixture of HSi(R$_1$)(R$_2$)(R$_3$) and HSi(R$_4$)(R$_5$)(R$_6$) may be used as the silane compound. In HSi(R$_1$)(R$_2$)(R$_3$) and HSi(R$_4$)(R$_5$)(R$_6$), R$_1$ to R$_6$ are the same as defined in Formula 1.

Each of HSi(R$_1$)(R$_2$)(R$_3$) and HSi(R$_4$)(R$_5$)(R$_6$) may be, for example, HSi(OCH$_3$)$_3$.

The Rf-(L$^1$)$_{p1}$-C(=O)—N(CH$_2$CH=CH$_2$)$_2$ may be obtained by reacting Rf-(L$^1$)$_{p1}$-C(=O)O—R as an ester compound having a fluorine-containing (poly)ether group with HN(CH$_2$CH=CH$_2$)$_2$.

A second method for preparing the silane compound having a fluorine-containing (poly)ether group represented by Formula 1 includes mixing Rf-(L$^1$)$_{p1}$-C(=O)O—R and HN—{(L$^2$)$_{p2}$—Si(R$_1$)(R$_2$)(R$_3$)}$_2$ to obtain a composition and reacting the composition to prepare a target product.

In Rf-(L$^1$)$_{p1}$-C(=O)O—R, R refers to a C1-C20 alkyl group, examples thereof include methyl, ethyl, n-propyl, propyl, butyl, pentyl, hexyl, and the like, and Rf and L$^1$ are the same as defined in Formula 1. In an embodiment, in H$_2$N-{(L$^2$)$_{p2}$—Si(R$_1$)(R$_2$)(R$_3$)}$_2$, L$_2$, p2, and R$_1$ to R$_3$ are the same as defined in Formula 1.

The compound of the formula Rf-(L$^1$)$_{p1}$-C(=O)O—R may include, for example, CF$_3$O(CF$_2$CF$_2$O)$_n$(CF$_2$O)$_m$—(CH$_2$)$_2$—C(=O)OCH$_3$,
CF$_3$O(CF$_2$CF$_2$O)$_n$(CF$_2$O)$_m$—(CH$_2$)$_2$—C(=O)OCH$_2$CH$_3$, and
CF$_3$O(CF$_2$CF$_2$O)$_n$(CF$_2$O)$_m$—(CH$_2$)$_2$—C(=O)OCH$_2$CH$_2$CH$_3$.

Herein, n and m are each independently an integer of 1 or greater, and k is 0 or an integer of 1 to 10.

In HN-{(L$^2$)$_{p2}$—Si(R$_1$)(R$_2$)(R$_3$)}$_2$, Rf and L$^2$ are the same as defined in Formula 1.

HN-{(L$^2$)$_{p2}$—Si(R$_1$)(R$_2$)(R$_3$)}$_2$ may be, for example, a compound E, or a compound F represented by Formulae:

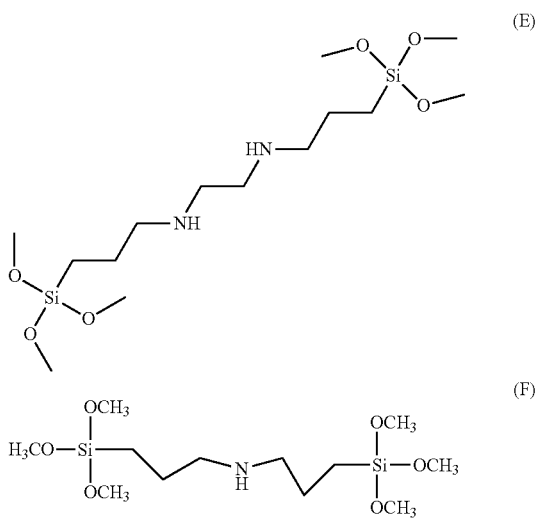

The reaction may be carried out under reaction conditions varying according to the kind of a start material, for example, at a temperature of about 25° C. to about 70° C., for example, about 25° C. to about 65° C., and for example, about 30° C. to about 60° C. The reaction may be carried out in the absence of, for example, a separate solvent.

The Rf—C(=O)—N(CH$_2$CH=CH$_2$)$_2$ is used to prepare the silane compound having a fluorine-containing (poly)ether group represented by Formula 1, and the Rf—C(=O)—N(CH$_2$CH=CH$_2$)$_2$ is obtained through a reaction between an ester compound having a fluorine-containing (poly)ether group, Rf—C(=O)OCH$_3$, and an amine compound of Formula 5:

HN(CH$_2$CH=CH$_2$)$_2$.        Formula 5

The compound of Formula 3, the compound of Formula 4, or a combination thereof may be further added to the composition.

The compound of Formula 3 in the composition may be used in an amount in a range of about 1 to about 2 mol, relative to about 1 mol of the ester compound containing the fluorine-containing (poly)ether group, Rf-(L$^1$)$_{p1}$-C(=O)O—R. If the amount of the compound represented by Formula 3 is about 2 mol, not only the silane compound having a fluorine-containing (poly)ether group represented by Formula 1 but also about 1 mol of the compound of Formula 2, the compound of Formula 3, or a combination thereof, may remain in the reaction product. A solvent may be added to the reaction product to be used in-situ in a film formation process.

The compound of Formula 4, or a combination of the compound of Formula 3 and the compound of Formula 4 may be further added to the composition.

The amount of the compound of Formula 4 or the amount of the combination of the compound of Formula 3 and the compound of Formula 4 may be about 1.05 to about 3.0 mol, relative to about 1 mol of the ester compound containing the fluorine-containing (poly)ether group, Rf-(L$^1$)$_{p1}$-C(=O)O—R.

Hereinafter, definitions of substituent groups used in various chemical formulae will be described.

The term "alkyl" used in various chemical formulae refers to a fully saturated branched or non-branched (straight chain or linear) hydrocarbon. Non-limiting examples of "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of "alkyl" may be substituted with a halogen atom, a hydroxy group, an alkoxy group, a nitro group, a cyano group, an amino group, an amidino group, a hydrazino group, a hydrazono group, a carbonyl group, a carbamyl group, a thiol group, an ester group, a carboxyl group or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof.

The term "alkenyl" as used herein refers to a linear or branched monovalent hydrocarbon group having one or more carbon-carbon double bonds. At least one hydrogen atom of the "alkenyl" may be substituted with a substituted as described above in connection with the alkyl group.

The term "alkynyl" as used herein refers to a linear or branched monovalent hydrocarbon group having one or more carbon-carbon triple bonds. At least one hydrogen atom of the "alkynyl" may be substituted with a substituted as described above in connection with the alkyl group.

The term "aryl alkyl" and "heteroaryl alkyl" as used herein refers to a substituted or unsubstituted aryl group or heteroaryl covalently linked to an alkyl group that is linked to a compound (e.g., a benzyl is a C7 aryl alkyl group). At least one hydrogen atom of the "aryl alkyl" or "heteroaryl alkyl" may be substituted with a substituted as described above in connection with the alkyl group.

The term "cycloalkyl" as used herein refers to a monovalent hydrocarbon group having one or more saturated rings in which all ring members are carbon (e.g., cyclopentyl and cyclohexyl). At least one hydrogen atom of the "cycloalkyl" may be substituted with a substituted as described above in connection with the alkyl group.

The term "cycloalkenyl" as used in the formulae refers to a monovalent hydrocarbon group having one or more rings and one or more carbon-carbon double bond in the ring, wherein all ring members are carbon (e.g., cyclopentyl and cyclohexyl).

At least one hydrogen atom of the "cycloalkenyl" may be substituted with a substituted as described above in connection with the alkyl group.

The term "cycloalkynyl" as herein refers to a stable aliphatic monocyclic or polycyclic group having at least one carbon-carbon triple bond, wherein all ring members are carbon (e.g., cyclohexynyl). At least one hydrogen atom of the "cycloalkynyl" may be substituted with a substituted as described above in connection with the alkyl group.

The term "heteroalkyl" as used herein refers to an alkyl group that comprises at least one heteroatom covalently bonded to one or more carbon atoms of the alkyl group.

At least one hydrogen atom of the "heteroalkyl" may be substituted with a substituted as described above in connection with the alkyl group.

The term "heteroaryl" as used herein refers to an aromatic group that comprises at least one heteroatom covalently bonded to one or more carbon atoms of aromatic ring.

At least one hydrogen atom of the "heteroaryl" may be substituted with a substituted as described above in connection with the alkyl group.

The term "halogen atom" used herein includes refers to fluorine, bromine, chlorine, iodine, and the like.

The term "alkoxy" used herein refers to an alkyl-O—, and the alkyl is as described above. Non-limiting examples of "alkoxy" include methoxy, ethoxy, propoxy, 2-propoxy, butoxy, tert-butoxy, pentyloxy, hexyloxy, cyclopropoxy, cyclohexyloxy, and the like. At least one hydrogen atom of the alkoxy group may be substituted with the same substituent as in the alkyl group described above.

The term "aryl" used herein refers to an aromatic hydrocarbon having one or more rings alone or in combination.

The term "aryl" used herein further refers to a group in which an aromatic ring is fused to at least one carbon ring. Non-limiting examples of "aryl" include phenyl, naphthyl, and tetrahydronaphthyl. In addition, at least one hydrogen atom of the aryl group may be substituted with the same substituent as in the alkyl group described above.

As used herein, "aromatic" refers to an organic compound or group comprising at least one unsaturated cyclic group having delocalized pi electrons. The term encompasses both hydrocarbon aromatic compounds and heteroaromatic compounds.

At least one hydrogen atom of the "aromatic" may be substituted with a substituted as described above in connection with the alkyl group.

The term "alkylene" as used herein refers to a substituted or unsubstituted bivalent saturated aliphatic alkylene (—$CH_2$—) covalently linked to a functional group on both the sides that is linked to a compound (e.g., an ethylene (—$CH_2$—$CH_2$—) is a C2 alkylene group, a propylene (—$CH_2CH_2CH_2$—) is a C3 alkylene group). At least one hydrogen atom of the "alkylene" may be substituted with a substituted as described above in connection with the alkyl group.

The term "oxyalkylene" as used herein refers to a substituted or unsubstituted bivalent saturated aliphatic-O-alkylene or alkylene-O— (e.g., an oxyethylene (—$OCH_2CH_2$—) is a C2 oxyalkylene group, a oxypropylene (—$OCH_2CH_2CH_2$—) is a C3 oxyalkylene group).

At least one hydrogen atom of the "oxyalkylene" may be substituted with a substituent as described above in connection with the alkyl group.

The term "amino" as used herein has the general formula —NRR, wherein each R is independently hydrogen, a C1-C12 alkyl group, a C7-C20 alkyl arylene group, a C7-C20 arylalkylene group, or a C6-C18 aryl group.

The term "arylene" as used herein refers to a functional group having at least two valences obtained by removal of at least two hydrogens in at least one aromatic ring, and optionally substituted with at least one substituent as described above in connection with the alkyl group.

Unless otherwise defined, the term "hetero" used herein refers to a compound which contains 1 to 4 heteroatoms N, O, S, Se, Te, Si, P, or a combination thereof.

Hereinafter, the embodiments are illustrated in more detail with reference to examples. However, the following examples are provided only for better explaining the present invention and the scope of the present invention is not limited to those examples in any sense.

EXAMPLES

Preparation of Silane Compound Having a Fluorine-containing (Poly)ether Group Preparation Example 1

10 grams of perfluoro(poly)ether methyl ester $CF_3O(CF_2CF_2O)_n(CF_2O)_m$—$(CH_2OCH_2)_2$—C(=O)$OCH_3$ (A) (weight average molecular weight (Mw): 3800 g/mol), 2.56 grams (0.0263 mol) of an amine compound $HN(CH_2CH=CH_2)_2$ (B), and 0.2 grams (0.0013 mol) of 1,8-diazabicyclo(5.4.0)undec-7-ene were added to 0.091 grams (0.0013 mol) of 1,2,4-triazole, stirred at 90° C. for 5 days, and washed 5 times with methanol/aqueous hydrochloric acid solution to remove an excess amine compound $HN(CH_2CH=CH_2)_2$ (B). Additionally, toluene was added to the resulting product to then be subjected to azeotropic distillation to remove excess amine and methanol, thereby obtaining $CF_3O(CF_2CF_2O)_n(CF_2O)_m$—$(CH_2)_2$—C(=O)—$N(CH_2CH=CH_2)_2$ (C).

$^1$H-NMR (500 MHz, $CDCl_3$/Novec7200) δ (ppm): 4.11 (4H), 4.30 (2H; overlapped with Novec 7200 area), 5.33-5.43 (4H), 5.99-6.09 (2H).

IR: An amide carbonyl peak was identified at 1669 $cm^{-1}$.

$HSi(OCH_3)_3$ was added to the compound (C) and reacted at 70° C. for 16 hours to obtain a mixture containing $CF_3O(CF_2CF_2O)_n(CF_2O)_m$—$(CH_2)_2$—C(=O)—N—$[CH_2CH_2CH_2Si(OCH_3)_3]_2$ (D).

Figure 4:
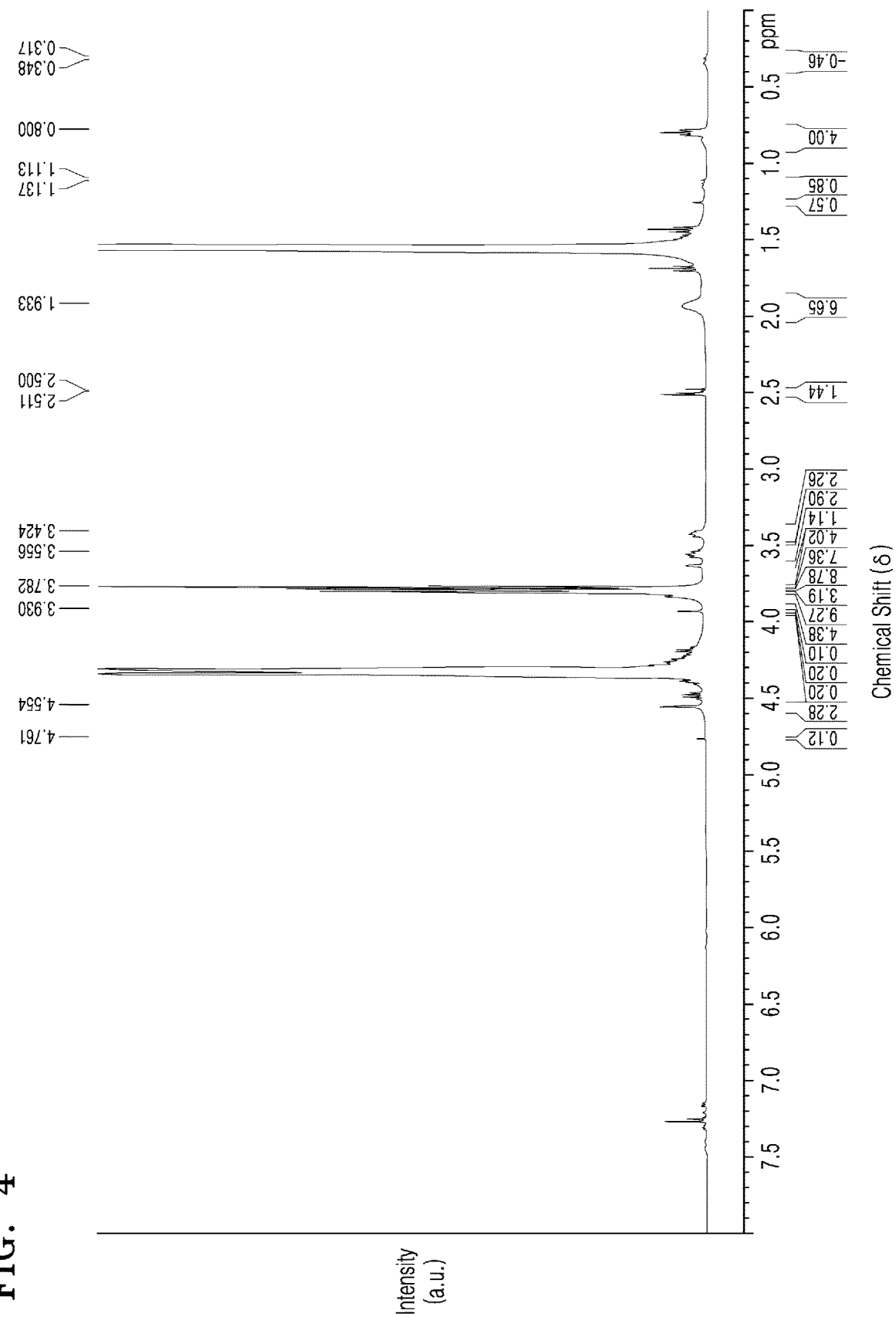
FIG. 4 is a diagram showing nuclear magnetic resonance (NMR) analysis results for a target product obtained in Preparation Example 1.

To the mixture was added Novec-7200 (3M) to obtain a composition containing the compound (D) in a concentration of 20 weight percent (wt %). The structure of the compound (D) was identified by the NMR spectrum shown in FIG. 4. In the compounds (A), (C) and (D), m is 20, n is 20, and a mixing ratio m:n is 1:1.

The NMR spectrum of the compound (D) was measured by putting the composition containing the compound (C)

into an insert tube and adding Novec 7200 as an NMR solvent, and the measurement result thereof will be described below.

NMR Spectrum of Compound D $^1$H-NMR (500 MHz, CDCl$_3$/Novec 7200) δ (ppm): 0.8 (4H), 1.93 (4H), 3.42-3.56 (4H), 3.78 (18H), 4.30 (2H, overlapped with Novec 7200 peak area)

IR: An amide carbonyl peak was identified at 1669 cm$^{-1}$.

Preparation Example 2

To one equivalent of CF$_3$O(CF$_2$CF$_2$O)$_n$(CF$_2$O)$_m$—(CH$_2$)$_2$—C(=O)OCH$_3$ (A), wherein m is 20 and n is 20, (weight average molecular weight (Mw): 3800 g/mol)) was added one equivalent of N,N'-bis[(3-trimethoxysilyl)propyl]ethylene diamine (E), and then reacted at 60° C. for 24 hours. Thus, PFPE-CH$_2$—C(=O)N[(CH$_2$)$_3$Si(OMe)$_3$][CH$_2$CH$_2$NH[(CH$_2$)$_3$Si(OMe)$_3$] as a compound of Formula 2-2 was obtained.

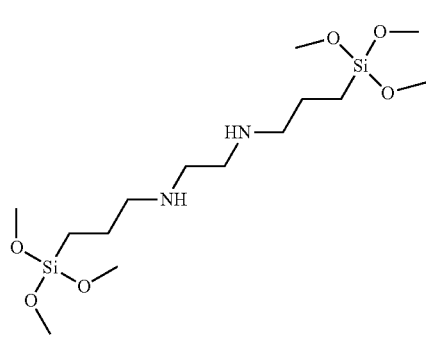

(E)

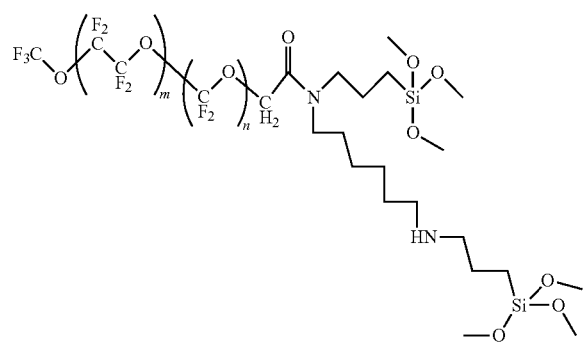

Formula 2-2 wherein in Formula 2-2, m is 20, and n is 20.

Preparation Example 3

To one equivalent of CF$_3$O(CF$_2$CF$_2$O)$_n$(CF$_2$O)$_m$—(CH$_2$)$_2$—C(=O)OCH$_3$, wherein m is 20 and n is 20, was added 1.5 equivalent of bis[3-(trimethoxysilyl)propyl]amine (F), and then reacted at 60° C. for 118 hours. Thus, CF$_3$O(CF$_2$CF$_2$O)$_n$(CF$_2$O)$_m$—(CH$_2$)$_2$—C(=O)—N—[CH$_2$CH$_2$CH$_2$Si(OCH$_3$)$_3$]$_2$ (D), wherein m is 20 and n is 20, was obtained.

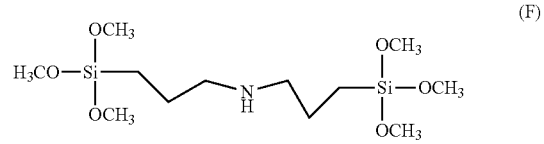 [SMILES: CO[Si](CCCNCCC[Si](OC)(OC)OC)(OC)OC]

(F)

Preparation Example 4

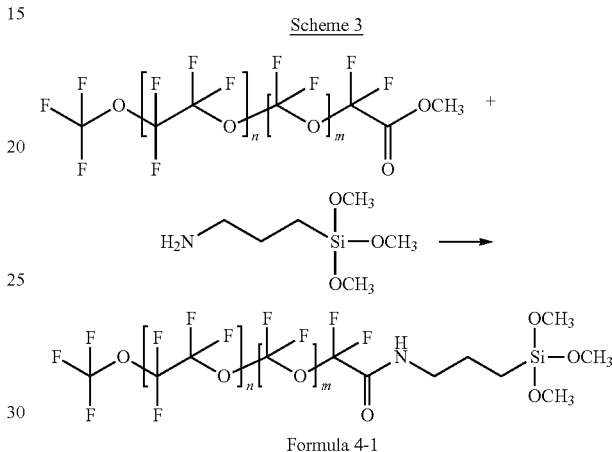

Scheme 3

Formula 4-1

To one equivalent of perfluoro(poly)ether methyl ester having the above formula (Mw: 5000 g/mol) was added 2 equivalents of 3-aminopropyl trimethoxy silane, and then stirred at 25° C. for 5 hours. Subsequently, after removing non-reactants with a rotatory pump, a resulting product was washed with a Novec-7500 (3M) solvent, a methanol layer was then removed, and the Novec-7500 solvent was removed in vacuo, thereby obtaining the compound of Formula 4-1.

$^1$H-NMR (500 MHz, Acetone-d$_6$) δ (ppm): 0.75 (2H), 1.8 (2H), 3.47 (2H), 3.67 (9H).

$^{19}$F-NMR (470.4 MHz, Acetone-d$_6$) δ (ppm): −54.5~−60.4 (42F), −83.1 (3F), −91.4~−93.1 (92F), −128.4~−132.1 (2F).

IR: An amide carbonyl peak was identified at 1729 cm$^{-1}$.

Preparation Example 5

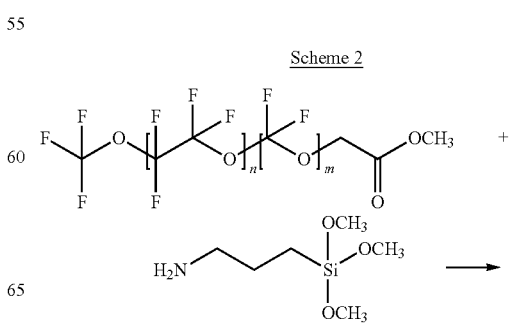

Scheme 2

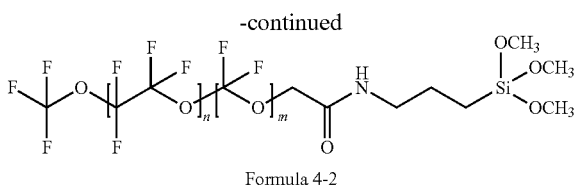

Formula 4-2 wherein in Formula 4-2, n is 18, and m is 16.

To one equivalent of perfluoro(poly)ether methyl ester (Mw: 5000 g/mol) was added one equivalent of 3-aminopropyl trimethoxy silane, and then stirred at 50° C. for 16 hours. Subsequently, after removing non-reactants with a rotatory pump, a resulting product was washed with a Novec-7500 solvent and methanol, a methanol layer was then removed, and the Novec-7500 solvent was removed in vacuo, thereby obtaining the compound of Formula 4-2.

NMR Spectrum of Compound 2B-1a $^1$H-NMR (500 MHz, Acetone-$d_6$) δ (ppm): 0.7 (2H), 1.77 (2H), 3.47 (2H), 3.67 (9H), 4.01 (2H).

$^{19}$F-NMR (470.4 MHz, Acetone-$d_6$) δ (ppm): −54.5~−60.4 (42F), −83.1 (3F), −91.4~−93.1 (92F), −128.4~−132.1 (2F).

IR: An amide carbonyl peak was identified at 1675 cm$^{-1}$.

Preparation of Compositions and Films

Example 1

The silane compound (D) having a fluorine-containing (poly)ether group, obtained in Preparation Example 1, and the aminosilane compound (B) HN—[CH$_2$CH$_2$CH$_2$Si(OCH$_3$)$_3$]$_2$ was mixed in a molar ratio of 1:1 in a Novec-7200 solvent (3M) to prepare a composition. A total content of the silane compound (D) and the aminosilane compound in the composition was 20 parts by weight based on 100 parts by weight of a total weight of the composition.

Next, the composition was coated (dry-coated) on a glass substrate having SiO$_2$ sputtered to a thickness of 7 nanometers (nm) by vacuum evaporation to prepare a 10 nm thick film. An amount of the composition impregnated as a sample during the vacuum evaporation was 0.15 grams per tablet.

Example 2

A composition was obtained in the same manner as in Example 1, except that a compound of Formula 4-1 as the silane compound having a fluorine-containing (poly)ether group, obtained in Preparation Example 4, was additionally added in preparing the composition, and a film was formed from the obtained composition. A mixing mole ratio of the silane compound (D) having a fluorine-containing (poly)ether group, obtained in Preparation Example 1, the aminosilane compound (B), and the compound of Formula 4-1 in the composition was 1:1:0.2.

Example 3

A composition was obtained in the same manner as in Example 1, except that a compound of Formula 4-2 as the silane compound having a fluorine-containing (poly)ether group, obtained in Preparation Example 5, was additionally added in preparing the composition, and a film was formed from the obtained composition. A mixing mole ratio of the silane compound (D) having a fluorine-containing (poly)ether group, obtained in Preparation Example 1, the aminosilane compound (B), and the compound of Formula 4-2 in the composition was 1:1:0.2.

Comparative Example 1

A composition was obtained in the same manner as in Example 1, except that, instead of the silane compound (D) having a fluorine-containing (poly)ether group, obtained in Preparation Example 1, CF$_3$O(CF$_2$CF$_2$O)$_n$(CF$_2$O)$_m$CH$_2$—O—CH$_2$CH$_2$CH$_2$Si(OMe)$_3$, wherein n is 20 and m is 20, was used, and a film was formed from the obtained composition.

Comparative Example 2

A composition was obtained in the same manner as in Example 1, except that, instead of the composition of Example 1, perfluoro(poly)ethylene (UD-509; Daikin) (Mw: 4000 g/mol) was used, and a film was formed from the obtained composition.

Comparative Example 3

A composition was obtained in the same manner as in Example 1, except that, instead of the composition of Example 1, perfluoro(poly)ethylene (KY1903; Shin-Etsu) (Mw: 4000 g/mol) was used, and a film was formed from the obtained composition.

Comparative Example 4

A composition was obtained in the same manner as in Example 1, except that, instead of the silane compound (D) having a fluorine-containing (poly)ether group, obtained in Preparation Example 1, a fluorine-containing ether compound represented by the Formula below was used, and a film was formed from the obtained composition. CF$_3$CF$_2$CF$_2$O{(CF$_2$O)$_{m21}$(CF$_2$CF$_2$O)$_{m22}$}CF$_2$—C(=O)N[CH$_2$CH$_2$CH$_2$Si(OCH$_3$)$_3$]$_2$ Reference Example 1

A composition was obtained in the same manner as in Example 1, except that, instead of the silane compound (C) having a fluorine-containing (poly)ether group, obtained in Preparation Example 1 and the aminosilane compound (B) represented by Formula below, the compound of Formula 4-2, obtained in Preparation Example 5, and aminosilane (B2) represented by Formula below, were used, and a film was formed from the obtained composition.

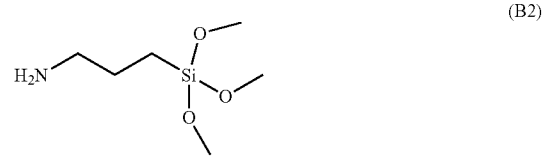

(B2)

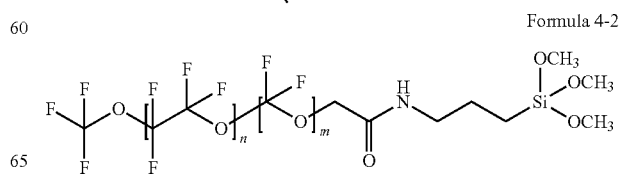

Formula 4-2

Evaluation Example 1: Analysis of Durability and Slipping Property (1) Durability Durability of each of the films according to Example 1, Comparative Examples 1 to 4, and Reference Example 1 was evaluated.

The durability of each film was assessed by a change in the contact angle due to friction.

An initial contact angle was measured by a Sessile drop technique by dropping water on the film with a Drop shape analyzer (DSA100, KRUSS, Germany). Subsequently, the film was rubbed 10,000 times by using a 6 mm-wide polyurethane rubber eraser under a load of 1 kg until the change in the water contact angle reached about 20° (or until the change in the water contact angle exceeds 20°). Then, changes in the water contact angle after the rubbing were measured and the results thereof are given in Table 1. In an embodiment, the slip property of each film was assessed by measuring a coefficient of friction (COF) of a glass substrate of the film using a COF tester (model name: FPT-F1; LABTHINK Instruments, China) according to a manual standard measurement method.

(2) Chemical Resistance

Test method and conditions: The chemical resistance was tested using an abrasion resistance tester and the abrasion test was carried out by continuously spraying an appropriate amount of ethanol onto a coating surface.

The initial contact angle is evaluated by Sessile drop technique by using a Drop shape analyzer (DSA100; KRUSS, Germany) and dropping water on the film. Subsequently, the film was rubbed 6000 times by using a 6 millimeter (mm)-wide polyurethane rubber eraser under a load of 1 kg until the change in the water contact angle reached about 20° (or until the change in the water contact angle exceeds 20°). Water contact angle changes after the rubbing were measured and the results thereof are given in Table 1. The changes in the water contact angle, and, after the abrasion test, damages, or cracking occurring to abraded portions of the coating layer were examined with naked eye and evaluated in the following criteria. Evaluation criteria are as follows:

Good: Cracking or discoloration of coating layer is barely observed; and

Bad: Cracking and/or discoloration of coating layer is observed.

(3) Visibility after Brine Resistance Test

The compositions of Example 1, Comparative Examples 1 to 4, and Reference Example 1 were coated on reinforced glass and dried at 25° C. to form coating layers, and thus samples were prepared.

The samples were left undisturbed in a chamber being under a saltwater spraying condition for 72 hours, and the samples were then taken out and washed with distilled water. Then, cracking, strain or discoloration of the coating layers were observed in humid conditions, and were evaluated in the following criteria. Evaluation criteria are as follows:

Good: Cracking or discoloration is barely observed on coating layer; and

Bad: Cracking or discoloration is observed on coating layer.

TABLE 1

| Category | Coefficient of friction | Durability | | | Chemical resistance | | Visibility after brine resistance test |
|---|---|---|---|---|---|---|---|
| | | Water contact angle (°) at initial coating stage | Change in water contact angle (°) | Durability | Water contact angle Change (°) | Chemical Resistance | |
| Example 1 | 0.122 | 115.6 | −5.3 | Good | −10.3 | Good | Good |
| Comparative Example 1 | 0.231 | 116.3 | −4.6 | Bad | — | Bad | Bad |
| Comparative Example 2 | 0.09 | 118.0 | — | Bad | −10.0 | Good | Bad |
| Comparative Example 3 | 0.153 | 113.9 | — | Bad | −10.6 | Good | Good |
| Reference Example 1 | 0.09 | 115.1 | −8.2 | Good | −13.5 | Good | Bad |

As shown in Table 1, in Example 1, the changes in the water contact angle after rubbing 10,000 times were reduced, as compared to those in Comparative Examples 1 to 3 and Reference Example 1. This confirms that the film of Example 1 has improved friction durability, as compared to the films of Comparative Example 1 to 3 and Reference Example 1.

In addition, as shown in Table 1, the film of Example 1 had a coefficient of friction of 0.15 or less, suggesting that the film of Example 1 demonstrated a superior slip property, like the films of Comparative Example 1 and Reference Examples 1 to 3.

In addition, compared to Comparative Examples 1 and 2, Example 1 showed improved chemical resistance and brine resistance. In addition, Example 1 showed a smaller change in the water contact angle than Comparative Example 3, confirming that the film of Example 1 had better chemical resistance than the film of Comparative Example 3.

In addition, durability of each of the films according to Examples 2 and 3 was evaluated by the same evaluation method as in Example 1. As a result, the films of Examples 2 and 3 showed smaller changes in the water contact angle after rubbing than the films of Comparative Examples 1 to 3 and Reference Example 1. These evaluation results confirmed that the films of Examples 2 and 3 had improved friction durability, compared to the film of Comparative Examples 1 to 3 and Reference Example 1.

In addition, the friction durability, slip property and chemical resistance of the film of Comparative Example 4 were similar to those of the film of Comparative Example 1.

Evaluation Example 2: IR Analysis

A Fourier transform infrared spectroscopy (FT-IR) analysis was performed on the silane compounds each having a fluorine-containing (poly)ether group, prepared in Preparation Examples 1 and 2, the composition of Example 1, and perfluoro(poly)ether methyl ester (A) as a start material used in preparing the silane compounds of Preparation Examples 1 and 2.

The FT-IR analysis was performed using a Nicolet iS50 FT-IR spectrometer (Thermo Scientific). The IR analysis results are shown in FIG. 3.

Figure 3:
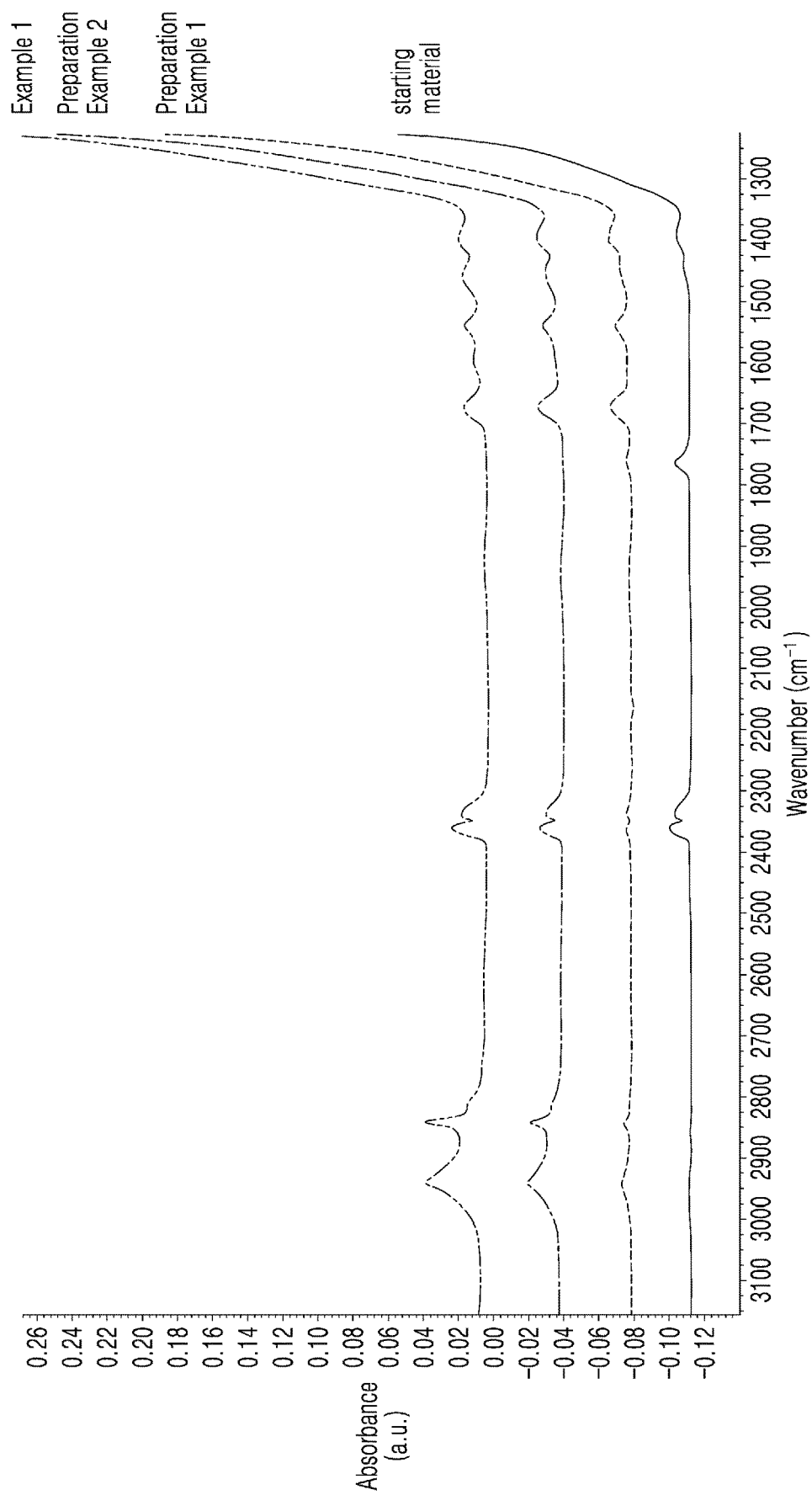
FIG. 3 is a diagram showing infrared (IR) spectroscopy analysis results for the silane compounds each having a fluorine-containing (poly)ether group, prepared in Preparation Examples 1 and 2, the composition of Example 1, and perfluoro(poly)ether methyl ester (A) as a starting material used in preparing the silane compounds of Preparation Examples 1 and 2.

FIG. 3 is a diagram showing infrared (IR) spectroscopy analysis results for the silane compounds each having a fluorine-containing (poly)ether group, prepared in Preparation Examples 1 and 2, the composition of Example 1, and perfluoro(poly)ether methyl ester (A) as a starting material used in preparing the silane compounds of Preparation Examples 1 and 2.

As a result of the IR analysis, perfluoro(poly)ether methyl ester (A) as the start material was observed at 1760 cm$^{-1}$. By contrast, in Preparation Examples 1 and 2 and Example 1, carbonyl (C=O) band peaks were observed at 1669 cm$^{-1}$.

While one or more exemplary embodiments have been particularly shown and described, the embodiments described herein are not intended to limit the scope of the one or more embodiments, and it will be appreciated that various changes and improvements in form and detail may be made by those skilled in the art from the basic inventive concept defined in the appended claims.

A coating layer may be formed by using the composition comprising a silane compound having a fluorine-containing (poly)ether group according to an embodiment, the coating layer having improved durability by increasing abrasion resistance while maintaining a high slip property, and having improved chemical resistance and brine resistance.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A silane compound comprising a fluorine-containing ether group, wherein the silane compund is $CF_3O(CF_2CF_2O)_n(CF_2O)_m$—$(CH_2)_3$—$C(=O)N\{(CH_2)_3$—$Si(OCH_3)(OCH_3)(OCH_3)\}_2$, $CF_3O(CF_2O)_m(CF_2CF_2O)_n$—$(CH_2)_3$—$C(=O)N\{(CH_2)_3$—$Si(OCH_3)(OCH_3)(OCH_3)\}_2$, $CF_3CF_2O(CF_2CF_2O)_n(CF_2O)_m$—$(CH_2)$—$C(=O)N\{(CH_2)_3$—$Si(OCH_3)(OCH_3)(OCH_3)\}_2$, $CF_3CF_2O(CF_2O)_m(CF_2CF_2O)_n$—$(CH_2)$—$C(=O)N\{(CH_2)_3$—$Si(OCH_3)(OCH_3)(OCH_3)\}_2$, $CF_3CF_2O(CF_2CF_2O)_n(CF_2O)_m$—$(CH_2)$—$C(=O)N\{(CH_2)_3$—$Si(OCH_3)(OCH_3)(OCH_3)\}_2$, a compound of Formula 2-1,
a compound of Formula 2-2,
a compound of Formula 2-3, or
a combination thereof,
wherein n and m are each independently an integer of 1 to 100

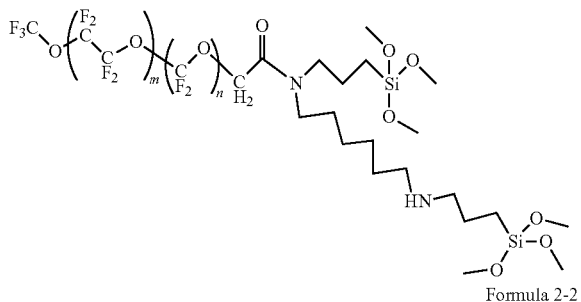

Formula 2-1

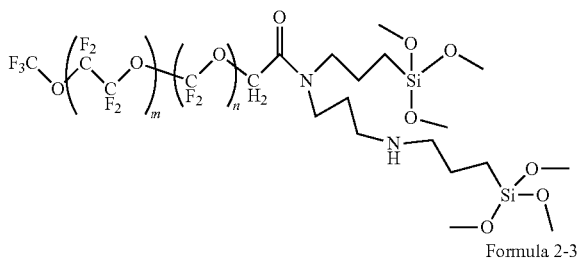

Formula 2-2

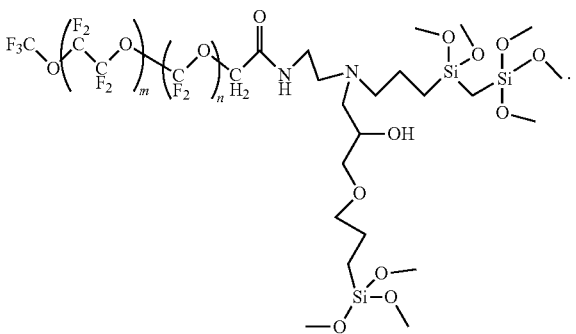

Formula 2-3

2. The silane compound of claim 1, having a weight average molecular weight of about 2,000 grams per mol to about 10,000 grams per mol.

3. A composition comprising the silane compound including a fluorine-containing ether group of claim 1.

4. The composition of claim 3, further comprising a compound represented by Formula 3:

A-L$^6$-Si(R$_1$)(R$_2$)(R$_3$)  Formula 3 wherein in Formula 3,

A is a halogen atom, a thiol group, an isocyanate group, an amino group, an allylamino group, or —NH(L$^7$-Si(R$_4$)(R$_5$)(R$_6$)), L$^6$ and L$^7$ are each independently a substituted or unsubstituted C1 to C20 alkylene group, a substituted or unsubstituted C6 to C20 arylene group, or a combination thereof, and R$_1$ to R$_6$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof,
with the proviso that at least one of $R_1$ to $R_3$ and at least one of $R_4$ to $R_6$ are each independently a substituted or unsubstituted C1 to C20 alkoxy group, a halogen atom, or a hydroxy group.

5. The composition of claim 4, wherein a mixing ratio by mol of the silane compound comprising a fluorine-containing ether group of claim 1 to a compound of Formula 3 is about 1:0.003 to about 1:3.

6. The composition of claim 4, wherein the compound of Formula 3 is
$H_2N$—$(CH_2)_3$—$Si(OCH_3)(OCH_3)(OCH_3)$,
$H_2N$—$(CH_2)_3$—$Si(OCH_2CH_3)(OCH_2CH_3)(OCH_2CH_3)$,
$H_2N$—$(CH_2)_3$—$Si(OCH_3)(OCH_3)(CH_3)$,
$H_2N$—$(CH_2)_3$—$Si(OCH_2CH_3)(OCH_2CH_3)(CH_2CH_3)$,
$HN$—$\{(CH_2)_3$—$Si(OCH_3)(OCH_3)(OCH_3)\}_2$,
$HN$—$\{(CH_2)_3$—$Si(OCH_2CH_3)(OCH_2CH_3)(OCH_2CH_3)\}_2$,
$HN$—$\{(CH_2)_3$—$Si(OCH_3)(OCH_3)(CH_3)\}_2$,
$HN$—$\{(CH_2)_3$—$Si(OCH_2CH_3)(OCH_2CH_3)(CH_2CH_3)\}_2$,
a compound of Formula 3-1,
a compound of Formula 3-2, or
a combination thereof, Formula 3-1

Formula 3-2

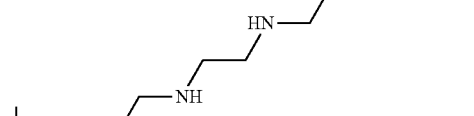

7. The composition of claim 3, further comprising a compound represented by Formula 4:

FpE-$(L^2)_{p1}$-LG-$(L^3)_{p2}$-Si$R^aR^bR^c$      Formula 4 wherein in Formula 4,
FpE is a fluorine-containing (poly)ether moiety,
$R^a$, $R^b$ and $R^c$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R^a$, $R^b$ and $R^c$ is a substituted or unsubstituted C1 to C20 alkoxy group, a halogen atom, or a hydroxy group,
LG is a linking group having a hydrogen-bonding functional group,
$L^2$ and $L^3$ are each independently a substituted or unsubstituted C1 to C20 alkylene group, a substituted or unsubstituted C6 to C20 arylene group, a substituted or unsubstituted C1 to C20 oxyalkylene group, or a combination thereof, and
p1 and p2 are each independently an integer of 0 to 10.

8. The composition of claim 7, wherein the compound of Formula 4 is a compound represented by Formula 4A-1 or 4B-1:

$CF_3O(CF_2CF_2O)_n(CF_2O)_mCF_2$-$(C_qH_{2q}OC_qH_{2q})_{p1}$—C(=O)NH—$(C_rH_{2r})_{p2}$—Si$R^aR^bR^c$    Formula 4A-1

$CF_3O(CF_2CF_2O)_n(CF_2O)_mCH_2$—$(C_qH_{2q}OC_qH_{2q})_{p1}$—C(=O)NH—$(C_rH_{2r})_{p2}$—Si$R^aR^bR^c$    Formula 4B-1 wherein in Formula 4A-1 and 4B-1,
$R^a$, $R^b$ and $R^c$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R^a$, $R^b$ and $R^c$ is a substituted or unsubstituted C1 to C20 alkoxy group, a halogen atom, or a hydroxy group,
n, m are each independently 0 or an integer of 1 to 100, and
p1 and p2 are each independently an integer of 0 to 10.

9. The composition of claim 7, wherein the compound of Formula 4 is a compound of Formula 4-1 or 4-2:

Formula 4-1

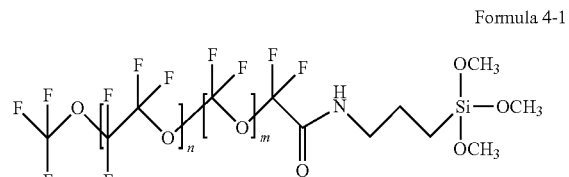

wherein in Formula 4-1,
n is a number of 1 to 100, and m is a number of 1 to 100, and Formula 4-2

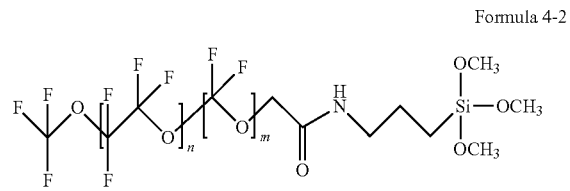

wherein in Formula 4-2,
n is a number of 1 to 100, and
m is a number of 1 to 100.

10. A film comprising a hydrolysis and polycondensation product of the silane compound having a fluorine-containing ether group of claim 1.

11. The film of claim 10, further comprising a compound represented by Formula 3, a compound represented by Formula 4, or a combination thereof:

A-$L^6$-Si$(R_1)(R_2)(R_3)$      Formula 3 wherein in Formula 3,
A is a halogen atom, a thiol group, an isocyanate group, an amino group, an allylamino group, or —NH($L^7$-Si$(R_4)(R_5)(R_6)$), L⁶ and L⁷ are each independently a substituted or unsubstituted C1 to C20 alkylene group, a substituted or unsubstituted C6 to C20 arylene group, or a combination thereof, and $R_1$ to $R_6$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R_1$ to $R_3$ and at least one of $R_4$ to $R_6$ are each independently a substituted or unsubstituted C1 to C20 alkoxy group, a halogen atom, or a hydroxy group.

$$FpE-(L^2)_{p1}-LG-(L^3)_{p2}-SiR^aR^bR^c \qquad \text{Formula 4}$$

wherein in Formula 4,

FpE is a fluorine-containing (poly)ether moiety, $R^a$, $R^b$ and $R^c$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R^a$, $R^b$ and $R^c$ is a substituted or unsubstituted C1 to C20 alkoxy group, a halogen atom, or a hydroxy group, LG is a linking group having a hydrogen-bonding functional group, $L^2$ and $L^3$ are each independently a substituted or unsubstituted C1 to C20 alkylene group, a substituted or unsubstituted C6 to C20 arylene group, a substituted or unsubstituted C1 to C20 oxyalkylene group, or a combination thereof, and p1 and p2 are each independently an integer of 0 to 10.

12. A film comprising
a combination of a hydrolysis and polycondensation product of the silane compound having a fluorine-containing ether group according to claim 1, and a compound being represented by Formula 3, or
a combination of a silane compound having a fluorine-containing ether group according to claim 7, and a hydrolysis and polycondensation product of the compound represented by Formula 3, or
a combination of a hydrolysis and polycondensation product of the silane compound having a fluorine-containing ether group according to claim 1, and a hydrolysis and polycondensation product of the compound represented by Formula 3, $$A-L^6-Si(R_1)(R_2)(R_3) \qquad \text{Formula 3}$$

wherein in Formula 3,

A is a halogen atom, a thiol group, an isocyanate group, an amino group, an allylamino group, or —NH(L⁷-Si(R₄)(R₅)(R₆)), L⁶ and L⁷ are each independently a substituted or unsubstituted C1 to C20 alkylene group, a substituted or unsubstituted C6 to C20 arylene group, or a combination thereof, and $R_1$ to $R_6$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that that at least one of $R_1$ to $R_3$ and at least one of $R_5$ to $R_7$ is a substituted or unsubstituted C1 to C20 alkoxy group, a halogen atom, or a hydroxy group;

$$FpE-(L^2)_{p1}-LG-(L^3)_{p2}-SiR^aR^bR^c \qquad \text{Formula 4}$$

wherein in Formula 4,

FpE is a fluorine-containing ether moiety, $R^a$, $R^b$ and $R^c$ are each independently hydrogen, a substituted or unsubstituted C1 to C20 alkoxy group, a halogen atom, a hydroxy group, a substituted or unsubstituted C1 to C20 alkyl group, a substituted or unsubstituted C6 to C20 aryl group, or a combination thereof, with the proviso that at least one of $R^a$, $R^b$ and $R^c$ is a substituted or unsubstituted C1 to C20 alkoxy group, a halogen atom, or a hydroxy group, LG is a linking group having a hydrogen-bonding functional group, $L^2$ and $L^3$ are each independently a substituted or unsubstituted C1 to C20 alkylene group, a substituted or unsubstituted C6 to C20 arylene group, a substituted or unsubstituted C1 to C20 oxyalkylene group, or a combination thereof, and p1 and p2 are each independently an integer of 0 to 10.

13. A display device comprising:
a film comprising a product of hydrolysis and polycondensation of the silane compound having a fluorine-containing ether group of claim 1.

14. An article comprising a coating product of a composition including the silane compound having a fluorine-containing ether group of claim 1.

* * * * *